United States Patent
Numao et al.

(10) Patent No.: US 8,654,259 B2
(45) Date of Patent: Feb. 18, 2014

(54) IMAGE PROCESSING SYSTEM AND DISPLAY DEVICE

(75) Inventors: Takaji Numao, Osaka (JP); Seiichi Gohshi, Osaka (JP); Takashi Mine, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/579,046

(22) PCT Filed: Dec. 3, 2010

(86) PCT No.: PCT/JP2010/071731
§ 371 (c)(1),
(2), (4) Date: Aug. 15, 2012

(87) PCT Pub. No.: WO2011/102046
PCT Pub. Date: Aug. 25, 2011

(65) Prior Publication Data
US 2012/0314137 A1 Dec. 13, 2012

(30) Foreign Application Priority Data
Feb. 18, 2010 (JP) .................................. 2010-033320

(51) Int. Cl.
*H04N 5/21* (2006.01)
(52) U.S. Cl.
USPC .......................................... 348/607; 348/618
(58) Field of Classification Search
USPC ................. 348/571, 659–661, 607, 606, 624, 348/618–621, 627–630
IPC ................. H04N 5/21,9/67, 5/14, 9/64
See application file for complete search history.

(56) References Cited

U.S. PATENT DOCUMENTS

| 5,929,936 A * | 7/1999 | Arai et al. ...................... 348/607 |
| 6,195,132 B1 | 2/2001 | Kimura et al. |
| 2007/0018932 A1 | 1/2007 | Takaki et al. |
| 2012/0169936 A1* | 7/2012 | Persson et al. ................ 348/607 |

FOREIGN PATENT DOCUMENTS

| JP | 07-250264 A | 9/1995 |
| JP | 08-172368 A | 7/1996 |
| JP | 09-163185 A | 6/1997 |
| JP | 10-084498 A | 3/1998 |
| JP | 10-248027 A | 9/1998 |

(Continued)

OTHER PUBLICATIONS

Official Communication issued in International Patent Application No. PCT/JP2011/052548, mailed on May 10, 2011.

(Continued)

*Primary Examiner* — Sherrie Hsia
(74) *Attorney, Agent, or Firm* — Keating & Bennett, LLP

(57) ABSTRACT

A liquid crystal display device (101) of the present invention includes an NR circuit (106) for carrying out a signal processing process in which a predetermined noise amount is added to or subtracted from data of a target pixel in accordance with a result of a comparison of signal levels between the target pixel and at least two surrounding pixels which are beside the target pixel, the NR circuit (106) adding or subtracting the predetermined noise amount to or from data of respective pixels adjacent to each other temporally or positionally in respective different signal processing processes. This allows providing a liquid crystal display device having a noise reduction effect. It is thus possible to provide a liquid crystal display device enabling less blur of an image after a noise reduction process.

9 Claims, 24 Drawing Sheets

(56) References Cited

FOREIGN PATENT DOCUMENTS

| | | |
|---|---|---|
| JP | 2000-022992 A | 1/2000 |
| JP | 2006-191454 A | 7/2006 |
| JP | 2007-033659 A | 2/2007 |
| JP | 2008-205737 A | 9/2008 |
| JP | 2010-148015 A | 7/2010 |
| JP | 2010-148017 A | 7/2010 |
| JP | 2010-166349 A | 7/2010 |

OTHER PUBLICATIONS

Numao et al., "Image Processing System and Display Device," U.S Application No. 13/643,149, filed Oct. 24, 2012.

Official Communication issued in International Patent Application No. PCT/JP2010/071731, mailed on Feb. 1, 2011.

\* cited by examiner

For Odd D/Odd H

For Even D/Odd H

For Odd D/Even H

For Even D/Even H

For Odd D/Odd H

For Even D/Odd H

For Odd D/Even H

For Even D/Even H (a)

|  | fy13 | fy42 | fy13 | fy42 | fy13 | fy42 | fy13 | fy42 |
|---|---|---|---|---|---|---|---|---|
| fx13 | A | C | A | C | A | C | A | C |
| fx42 | D | B | D | B | D | B | D | B |
| fx13 | A | C | A | C | A | C | A | C |
| fx42 | D | B | D | B | D | B | D | B |
| fx13 | A | C | A | C | A | C | A | C |
| fx42 | D | B | D | B | D | B | D | B |
| fx13 | A | C | A | C | A | C | A | C |
| fx42 | D | B | D | B | D | B | D | B |

IMAGE PROCESSING SYSTEM AND DISPLAY DEVICE

TECHNICAL FIELD

The present invention relates to noise reduction technologies with the use of digital image processing systems, in particular, to a noise reduction technology of a moving image, such as television. The present invention also relates to an image processing system and a display device which use the technology.

BACKGROUND ART

In Japan, analog broadcasting will end in 2011. Also in other developed countries, analog broadcasting will end and change to digital broadcasting. Demand for replacement purchases of televisions is thus expected to grow by about 2011 in the developed countries.

After 2012, however, television demand in the developed countries is predicted to slump. In contrast, in developing countries, such as Asia and South America, television demand is expected to grow also after 2012 because of their high economic growth rate. After 2012, the developing countries will play a central role in the television market.

In the developing countries, their broadcasting environments are so poor that video signals transmitted by analog broadcasting are weak in electric field and thus much noisy. Moreover, digital broadcasting in the developing countries often rebroadcasts video signals obtained by digitalizing analog video pictures recorded on a video tape. Such video signals have much noise. A noise reduction technology is thus essential for televisions for the developing countries.

As the noise reduction technology, a low-pass filter is known. Although the low-pass filter can reduce noise, it poses a problem that a video picture blurs.

Liquid crystal televisions now on the market in the developing countries are equipped with a digitalized image processing circuit. Such a liquid crystal television uses thus an adaptive low-pass filter utilizing a digital technology in order to reduce noise. An example of the adaptive low-pass filter is disclosed in Patent Literature 1.

FIGS. 20 through 22 are diagrams illustrating the adaptive low-pass filter disclosed in Patent Literature 1. As illustrated in FIG. 20, in this technology, noise of a target pixel 1 is removed with the use of values of nine pixels including adjacent eight pixels (hereinafter referred to as pixel values). A noise detection circuit 3 detects whether or not each of the nine pixels is noisy. A median filter circuit 2 will replace a pixel value of the pixel detected as noisy with a median of pixel values of the nine pixels. In this context, the median refers to the center value, i.e., the fifth pixel value of the pixel values of the nine pixels arranged in descending order (see FIG. 21).

As illustrated in FIG. 22, the noise detection circuit 3 includes a vertical direction noise detection circuit 5, a horizontal direction noise detection circuit 6, and other members.

The vertical direction noise detection circuit 5 detects differences in pixel value between the target pixel and pixels adjacent upwards and downwards to the target pixel. The vertical direction noise detection circuit 5 defines the target pixel as a vertical noise candidate when both the differences exceed a threshold.

The horizontal direction noise detection circuit 6 detects differences in pixel value between the target pixel and pixels adjacent leftwards and rightwards to the target pixel. The horizontal direction noise detection circuit 6 defines the target pixel as a horizontal noise candidate when both the differences exceed a threshold.

If the target pixel is the vertical noise candidate and the horizontal noise candidate, then the pixel value of the target pixel will be replaced with the median.

CITATION LIST

Patent Literature

Patent Literature 1
Japanese Patent Application Publication No. Tokukai, 2006-191454 A (Publication Date: Jul. 20, 2006)

SUMMARY OF INVENTION

Technical Problem

FIG. 23 shows an original image to which having discrete noise as often recognized in analog broadcasting. FIG. 24 shows an image obtained by processing the original image with the use of the means of Patent Literature 1. As is clear from a comparison between the image of FIG. 23 and the image of FIG. 24, noise is removed by the means of Patent Literature 1 to some extent, but great part of noise still remains. It is thus clear that the means of Patent Literature 1 is not effective enough.

Further, in Patent Literature 1, which uses a low-pass filter in order to carry out a noise reduction process, a pixel value of a target pixel which is noisy is replaced with a median of surrounding pixels. This causes the pixel value of the target pixel and pixel values of the surrounding pixels to become approximate. A video picture has thus less contrast due to lack of a difference in pixel value. This brings about a problem that a video picture having been subjected to the noise reduction process will blur.

Therefore, an object of the present invention is to provide an image processing system and a display device which (i) remove noise more effectively than the means of Patent Literature 1 and (ii) include means for reducing a blur more effectively than the means using the low-pass filter.

Solution to Problem

In order to solve the problems, an image processing system of the present invention is an image processing system for processing pixels arranged in matrix, the pixels corresponding to image data transmitted to the image processing system, the image processing system including: a signal processing circuit for carrying out signal processing processes in each of which the signal processing circuit adds or subtracts a predetermined noise amount to or from data of a target pixel in accordance with a result of a comparison of signal levels between the target pixel and at least two surrounding pixels which are beside the target pixel, the signal processing circuit carrying out the different signal processing processes to add or subtract the predetermined noise amount to or from data of respective target pixels adjacent to each other temporally or positionally.

According to the configuration, a noise reduction process is carried out in such a manner that the signal processing circuit adds or subtracts, in different signal processing processes, the predetermined noise amount to or from data of respective target pixels adjacent to each other temporally or positionally. In other words, a noise reduction process is carried out in such a manner that respective target pixels adjacent to each other temporally or positionally are subjected to different signal processing processes.

Note that an appropriate noise reduction process is carried out only if the signal processing process appropriately detects whether or not each of target pixels is noisy. Let it be assumed that a noise reduction process is carried out in such a manner that target pixels adjacent to each other temporally or positionally are subjected to a single signal processing process. In such a case, the two target pixels adjacent to each other cannot be subjected to an appropriate noise reduction process unless noise in the two target pixels is appropriately detected. If the both target pixels have noise, then the failure in detection will result in that the noise remains in both target pixels. This causes the noise to be larger and noticeable.

In the above configuration, a noise reduction process is carried out in such a manner that respective pixels adjacent to each other temporally or positionally are subjected to different signal processing processes. According to the configuration, probability in which appropriate noise reduction is carried out in any one of the signal processing processes is expressed by $s+(1-s)t$, where s is probability in which appropriate noise reduction is carried out in one signal processing process, and t is probability in which appropriate noise reduction is carried out in the other signal processing process. It is to be understood that the probability $s+(1-s)t$ is higher than both the probabilities s and t. Therefore, for example, if both of pixels adjacent to each other have noise, probability in which appropriate noise reduction is carried out in any one of the signal processing programs will be increased, resulting in low probability in which continuous noise remains.

This prevents noise added simultaneously to continuous pixels, that is, continuous noise from becoming a large noise agglomerate. It is thus possible to make noise of a video picture having been subjected to the noise reduction process less noticeable.

Besides, according to the present configuration, a predetermined noise amount is merely added to or subtracted from a pixel value of a target pixel. This allows remaining contrast supposed to be generated by differences in pixel values between the target pixel and surrounding pixels, although the pixel values become approximate to each other as much as the noise amount thus added or subtracted. As the result, the present configuration can reduce, even after the noise reduction process, blur of a video picture better than the case of Patent Literature 1 in which a pixel value of a noisy pixel is replaced with a median of surrounding pixels.

Therefore, the present configuration can reduce (i) noise more effectively than the means of Patent Literature 1, and (ii) blur more effectively than the means with the use of a low-pass filter.

The signal processing circuit in the image processing system of the present invention can be attained as will be described below.

That is, a signal processing circuit preferably carries out (i) a first signal processing process and (ii) a second signal processing process; in (i) the first signal processing process, the signal processing circuit (a) subtracting a predetermined noise amount x from data of a target pixel a when the target pixel a has a signal level which is larger than both signal levels of pixels b and c or (b) adding the predetermined noise amount x to the data of the target pixel a when the target pixel a has a signal level which is smaller than both signal levels of the pixels b and c, where the pixel b is located at a distance of n (where n is an integer) pixel from the target pixel a temporally or positionally, and the pixel c is located at a distance of −m (where m is an integer) pixel from the target pixel a temporally or positionally, and in (ii) the second signal processing process, the signal processing circuit (a) subtracting the predetermined noise amount x from data of a target pixel d when the target pixel d has a signal level which is larger than both signal levels of pixels e and f or (b) adding the predetermined noise amount x to the data of the target pixel d when the target pixel d has a signal level which is smaller than both signal levels of the pixels e and f, where the pixel e is located at a distance of p (where p is an integer) pixel from the target pixel d temporally or positionally, and the pixel f is located at a distance of −q (where q is an integer) pixel from the target pixel d temporally or positionally, the target pixel a and the target pixel d being adjacent to each other temporally or positionally, and the respective integers n, m, p, and q satisfying relations of n≠p and m≠q.

According to the configuration, it is clear that respective of the first signal processing process and the second signal processing process carries out different noise reduction processes. This is because (i) the first signal processing process is a process in which a predetermined noise amount x is (a) subtracted from data of the target pixel a when the target pixel a has a signal level which is larger than both signal levels of the pixels b and c or (b) added to the data of the target pixel a when the target pixel a has a signal level which is smaller than both signal levels of the pixels b and c, where the pixel b is located at a distance of n (where n is an integer) pixel from the target pixel a temporally or positionally, and the pixel c is located at a distance of −m (where m is an integer) pixel from the target pixel a temporally or positionally, and (ii) the second signal processing process is a process in which the predetermined noise amount x is (a) subtracted from data of the target pixel d when the target pixel d has a signal level which is larger than both signal levels of the pixels e and f or (b) added to the data of the pixel d when the target pixel d has signal level which is smaller than both signal levels of the pixels e and f, where the pixel e is located at a distance of p (where p is an integer) pixel from the target pixel d temporally or positionally, and the pixel f is located at a distance of −q (where q is an integer) pixel from the target pixel d temporally or positionally.

Therefore, even in a case where noise occurs in both the target pixels a and d, and the noises can become continuous noise, probability in which the noise remains in both the pixels will be significantly decreased. This prevents the continuous noise from becoming a large noise agglomerate. It is thus possible to make noise of a video picture having been subjected to the noise reduction process less noticeable.

Advantageous Effects of Invention

An image processing system of the present invention is an image processing system for processing pixels arranged in matrix, the pixels corresponding to image data transmitted to the image processing system, the image processing system including: a signal processing circuit for carrying out signal processing processes in each of which the signal processing circuit adds or subtracts a predetermined noise amount to or from data of a target pixel in accordance with a result of a comparison of signal levels between the target pixel and at least two surrounding pixels which are beside the target pixel, the signal processing circuit carrying out the different signal processing processes to add or subtract the predetermined noise amount to or from data of respective target pixels adjacent to each other temporally or positionally.

This prevents noise added simultaneously to continuous pixels, that is, continuous noise from becoming a large noise agglomerate. It is thus possible to make noise of a video picture having been subjected to the noise reduction process less noticeable.

Besides, according to the present configuration, a predetermined noise amount is merely added to or subtracted from a pixel value of a target pixel. This allows remaining contrast supposed to be generated by differences in pixel values between the target pixel and surrounding pixels, although the pixel values become approximate to each other as much as the noise amount thus added or subtracted. As the result, the present configuration can reduce, even after the noise reduction process, blur of a video picture better than the case of Patent Literature 1 in which a pixel value of a noisy pixel is replaced with a median of surrounding pixels.

Therefore, the present configuration can reduce (i) noise more effectively than the means of Patent Literature 1, and (ii) blur more effectively than the means with the use of a low-pass filter.

BRIEF DESCRIPTION OF DRAWINGS

FIG. 18 is a diagram illustrating another exemplified arrangement of adjacent pixels.

DESCRIPTION OF EMBODIMENTS

The following description will discuss embodiments of the present invention. Note that, before the discussion of the embodiments, a principle of the present invention will be described.

<Explanation of Principle of the Present Invention>

Figure 14:
FIG. 14 illustrates scanning states in an interlace signal: (a) of FIG. 14 illustrates a state in which a first frame (even lines) is scanned, and (b) of FIG. 14 illustrates a state in which a second frame (odd lines) is scanned.
Figure 14:
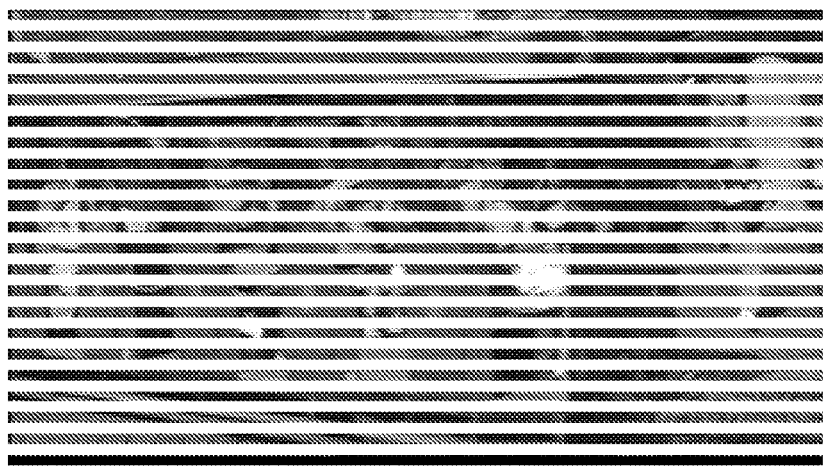

Signals used in SDTV broadcasting, such as NTSC (National Television System Committee) or PAL (Phase Alternating Line) system signals, are interlace signals which scan (i) even lines in a first field and (ii) odd lines in a second field, as illustrated in (a) and (b) of FIG. 14.

Figure 15:
FIG. 15 illustrates scanning states in an FPD: (a) of FIG. 14 illustrates a state in which a first frame is scanned, and (b) of FIG. 15 illustrates a state in which a second frame is scanned.
Figure 15:
Figure 16:
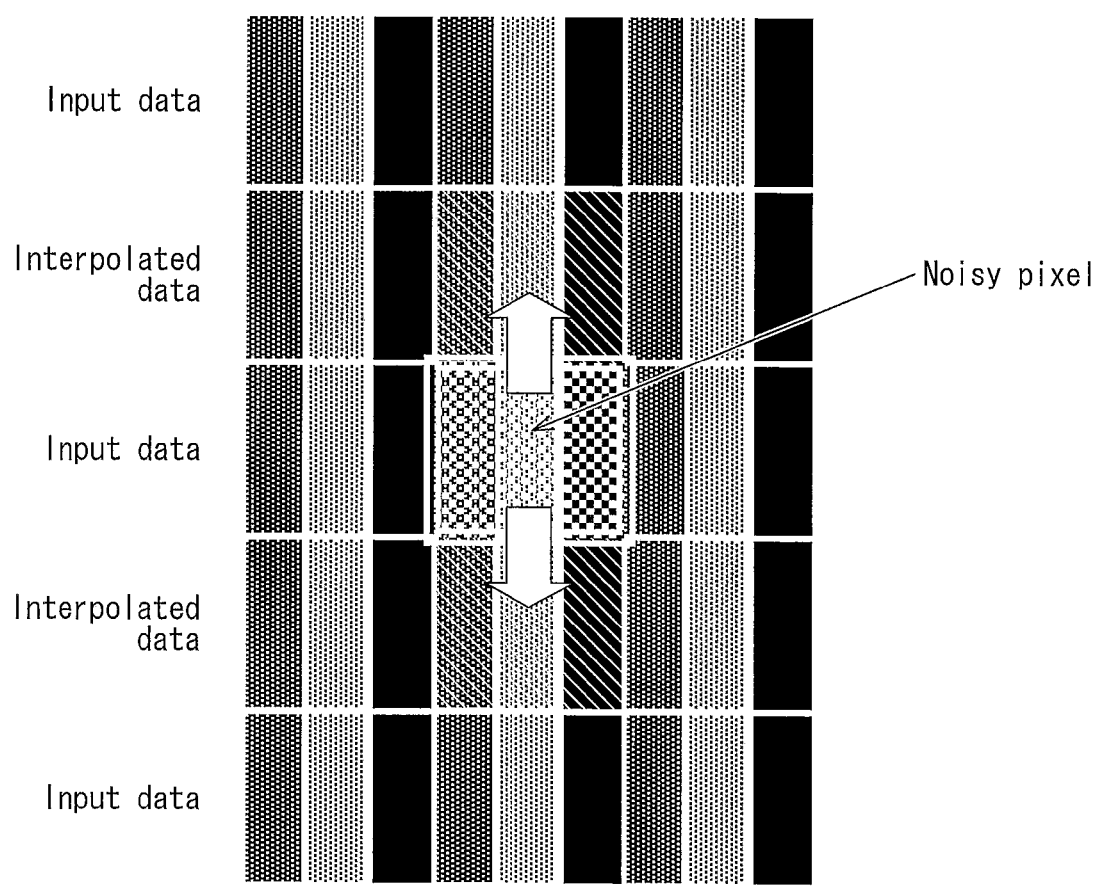
FIG. 16 is a diagram illustrating a principle of an IP conversion process.

However, in an FPD (Flat Panel Display), such as a liquid crystal television, all lines are scanned in each of first and second frames, as illustrated in (a) and (b) of FIG. 15. It is thus required to (i) generate signals (interpolated data) of interpolated lines from broadcasted interlace signals (input data), and (ii) convert them to progressive signals (the conversion being referred to as an I/P conversion) (see FIG. 16).

However, in broadcasting transmitting signals which are weak in electric field and thus likely to be noisy, static images broadcasted continuously will be recognized as a moving image due to influence of the noise. This activates an interpolation process within a field so that interpolated data is generated. In this case, the interpolated data is generated from input data having noise. This cases the noise to be enlarged upwards and downwards.

Noise can be added to not only one pixel but also a plurality of continuous pixels. In the latter case, if an I/P conversion is carried out without removing noise in the plurality of continuous pixels, then the noise will become a large noise agglomerate, which is significantly noticeable.

Therefore, a first image processing system of the present invention is an image processing system for processing pixels arranged in matrix, the pixels corresponding to image data transmitted to the image processing system. The image processing system is configured to carry out at least a first signal processing process and a second signal processing process, in order to make the noise less noticeable.

The first signal processing process is a process in which a predetermined noise amount x is (a) subtracted from data of a target pixel a, among the pixels arranged in matrix, when the target pixel a has a signal level which is larger than both signal levels of pixels b and c or (b) added to the data of the target pixel a when the target pixel a has a signal level which is smaller than both signal levels of the pixels b and c, where the pixel b is located at a distance of n (where n is an integer) pixel from the target pixel a temporally or positionally, and the pixel c is located at a distance of −m (where m is an integer) pixel from the target pixel a temporally or positionally.

On the other hand, the second signal processing process is a process in which the predetermined noise amount x is (a) subtracted from data of a target pixel d, among the pixels arranged in matrix, when the target pixel d has a signal level which is larger than both signal levels of pixels e and f or (b) added to the data of the target pixel d when the target pixel d has a signal level which is smaller than both signal levels of the pixels e and f, where the pixel e is located at a distance of p (where p is an integer) pixel from the target pixel d temporally or positionally, and the pixel f is located at a distance of −q (where q is an integer) pixel from the target pixel d temporally or positionally.

Here, the target pixel a and the target pixel d are adjacent to each other temporally or positionally, and the respective integers n, m, p, and q satisfy relations of n≠p and m≠q.

According to the image processing system of the above configuration, therefore, the respective target pixels a and d which are adjacent to each other temporally or positionally are subjected to noise reduction processes which use different parameters. Accordingly, probability in which noise is removed with any one of the parameters is expressed by s+(1−s)t, where s is probability in which noise is removed with one parameter, and t is probability in which noise is removed with the other parameter. This probability s+(1−s)t is larger than both the probabilities s and t.

As the result, in a case where noise is added to the plurality of continuous pixels, the probability in which noise is removed with any one of the parameters will be increased, resulting in low probability in which continuous noise remains. According to the image processing system, no large noise agglomerate will be generated, differently from the case where an I/P conversion is carried out without removing noise added to the plurality of pixels. This allows the noise to be less noticeable.

Figure 17:
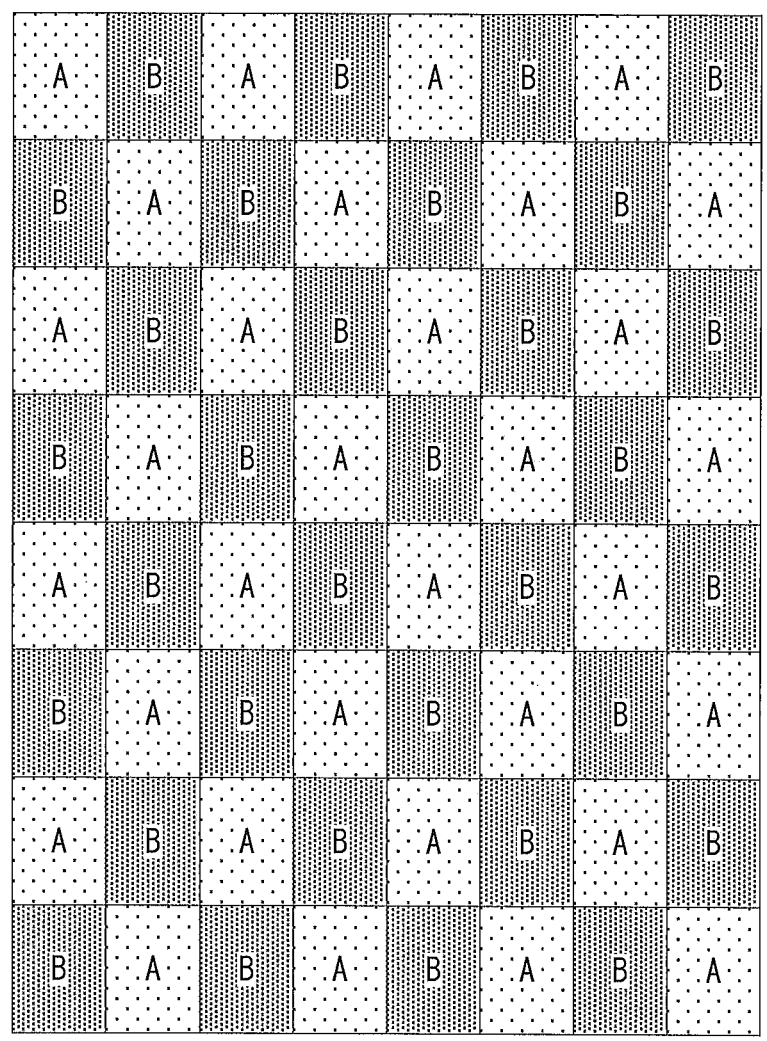
FIG. 17 is a diagram illustrating an exemplified arrangement of adjacent pixels.

Specifically, two types of pixels each being to be processed with any one of two different parameters are arranged in such a manner that a pixel to be processed with any one of the parameters is adjacent to pixels to be processed with the other of the parameters. For example, as illustrated in FIG. 17, two types of pixels each being to be processed with any one of two different parameters are arranged in a staggered manner. As the result, noise agglomerates become smaller and less noticeable even if noise in all the pixels is not successfully removed.

After the first signal processing process and the second signal processing process are carried out in a vertical direction, the first signal processing process and the second signal processing process can be carried out again in a lateral direction. In this case, the following four combinations of parameters are possible:

(1) the first signal processing process in a vertical direction×the first signal processing process in a lateral direction (2) the first signal processing process in a vertical direction×the second signal processing process in a lateral direction (3) the second signal processing process in a vertical direction×the first signal processing process in a lateral direction (4) the second signal processing process in a vertical direction×the second signal processing process in a lateral direction In such a case, pixels having respective different parameters are arranged in a lattice manner as illustrated in FIG. 18, rather than in a staggered manner.

This also makes noise agglomerates to become smaller and less noticeable.

Figure 19:
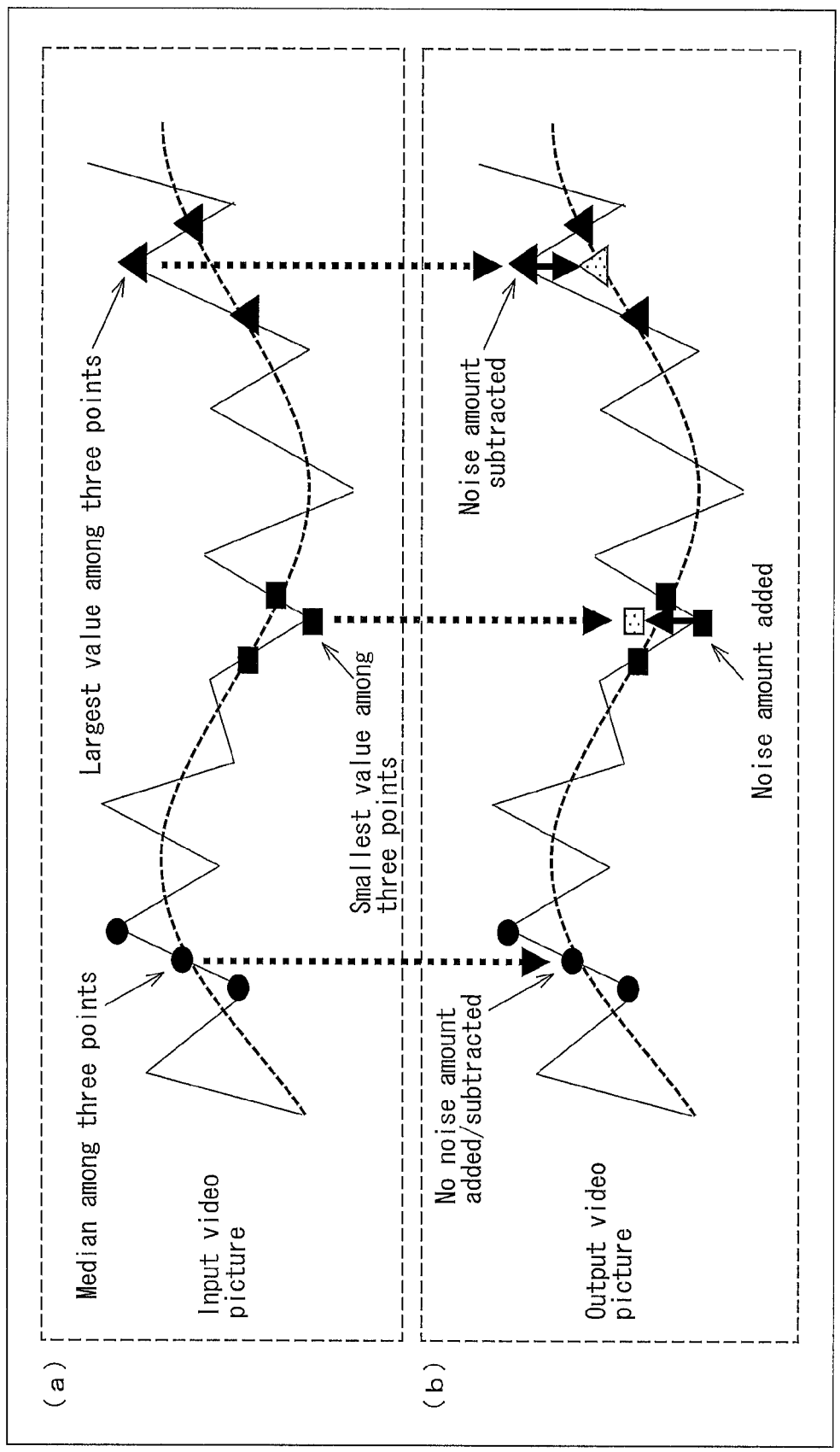
FIG. 19 is a diagram illustrating a principle of a noise reduction process of the present invention.
Figure 20:
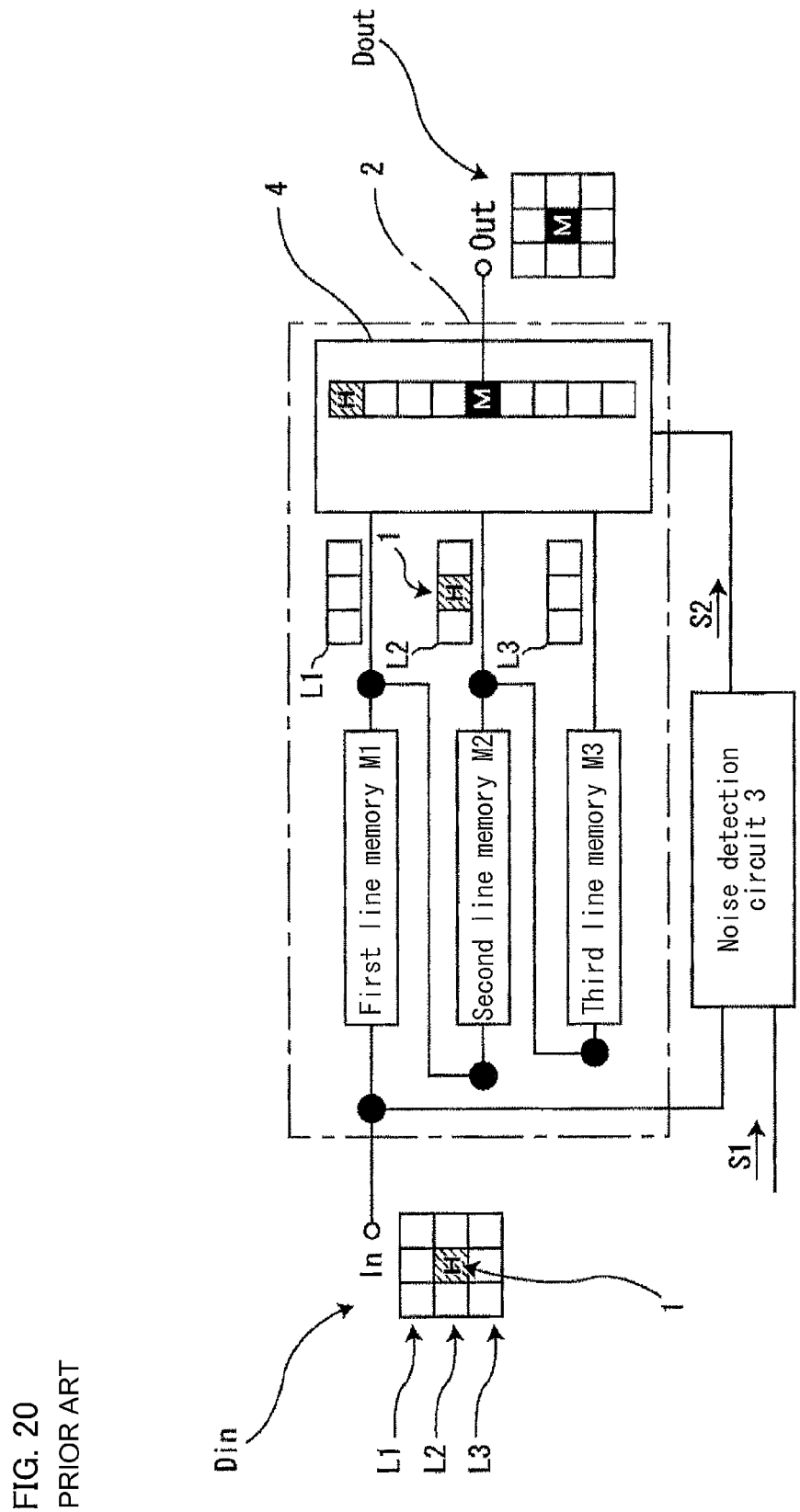
FIG. 20 is a block diagram illustrating schematically a configuration of a conventional adaptive low-pass filter.
Figure 21:
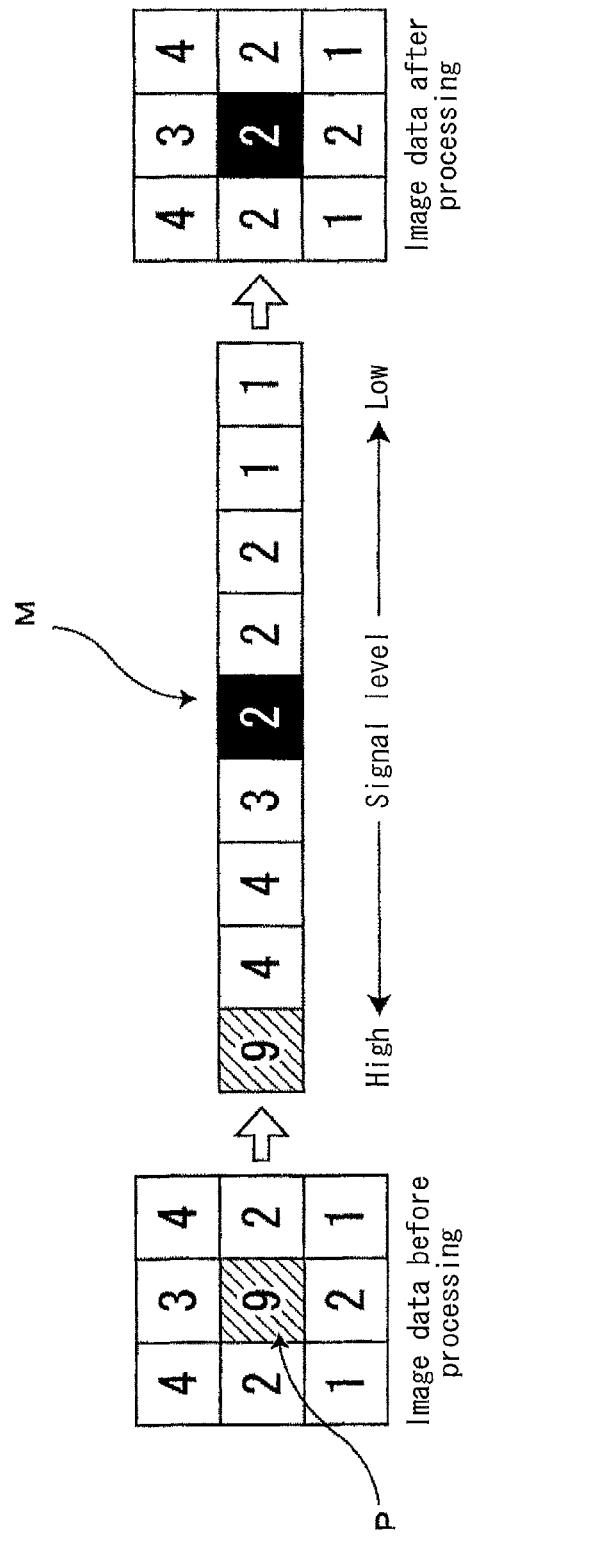
FIG. 21 is a diagram illustrating a principle of a noise reduction process of the adaptive low-pass filter of FIG. 20.
Figure 22:
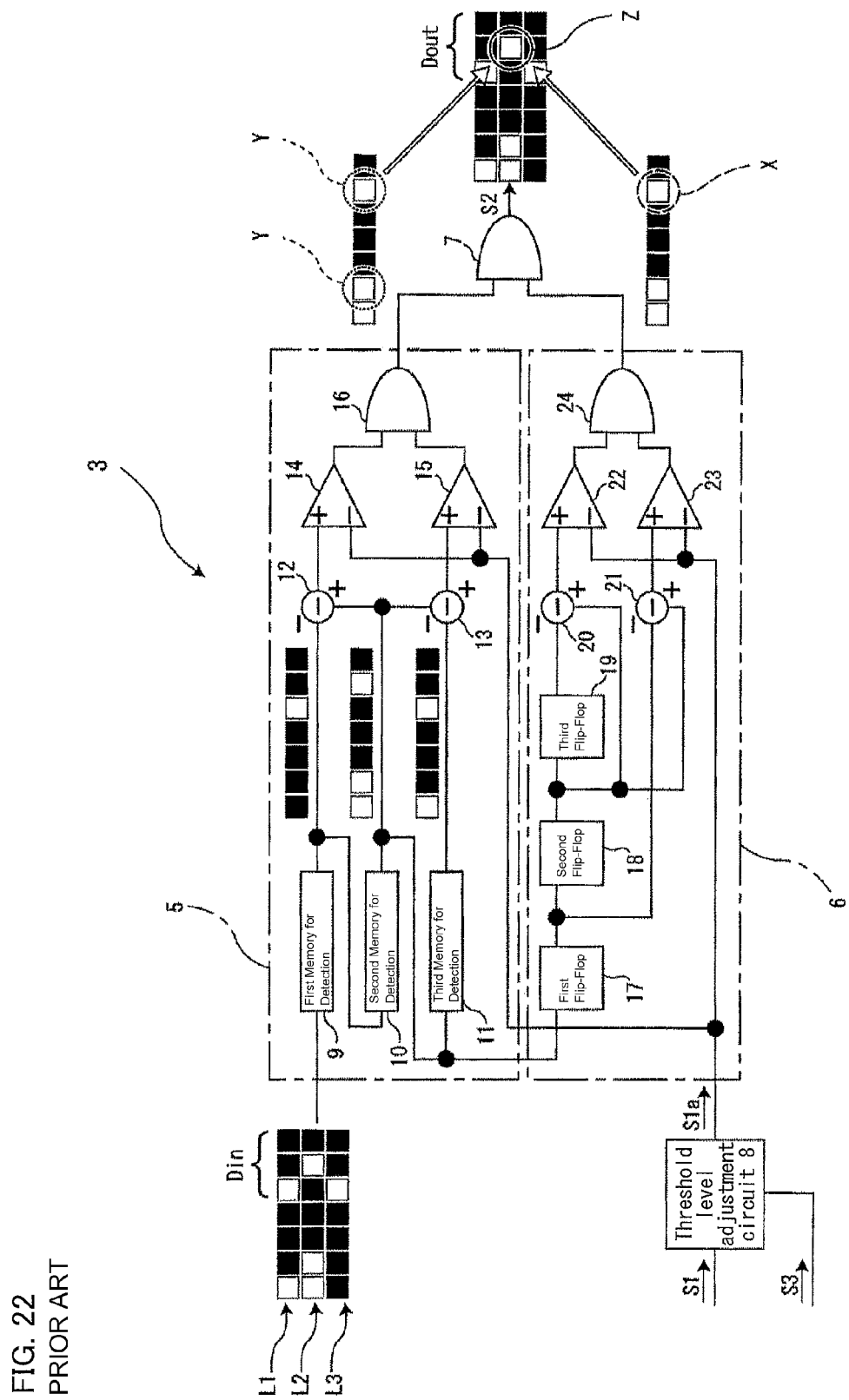
FIG. 22 is a block diagram illustrating schematically a configuration of a noise detection circuit of the adaptive low-pass filter of FIG. 20.

It is often the case where noise has a higher frequency than that of the original video signal. As illustrated in (a) of FIG. 19, therefore, a noisy video signal has a frequency higher than that of the original video signal (dashed line). Therefore, the noise reduction means of the present invention is configured to (i) determine a pixel having a largest or smallest value among neighboring pixels as a noisy pixel, and then (ii) subtract or add a previously obtained noise amount to or from the value of the noisy pixel (see (b) of FIG. 19).

Note that the way to obtain the noise amount affects efficiency of noise removal.

A second image processing system of the present invention includes means for optimizing the way to obtain the noise amount so as to make noise less noticeable. That is, the second image processing system is configured to (i) determine a pixel having a largest or smallest value among neighboring pixels as a noisy pixel, and then (ii) subtract, from a signal level Ya of the noisy pixel, an average value of signal levels Yb and Yc of two comparative pixels. The subtraction is expressed by $Era=Ya-(Yb+Yc)/2$. An average noise amount is obtained by (i) summing absolute values of the results of the subtraction, that is, Era, and (ii) dividing the sum by the number of the noisy pixels.

The average noise amount can be used as a noise amount x for a subsequent frame (or field) so as to estimate an exact noise amount since a noise amount is generally constant over a plurality of frames. This allows noise to be removed.

Consequently, noise removal will be carried out with less error. It is thus possible to make noise less noticeable.

The following description will discuss Embodiments 1 and 2. Embodiment 1 will address the first image processing system of the present invention, and Embodiment 2 will address the second image processing system of the present invention.

<Embodiment 1>

Embodiment 1 will discuss the first image processing system of the present invention.

Figure 1:
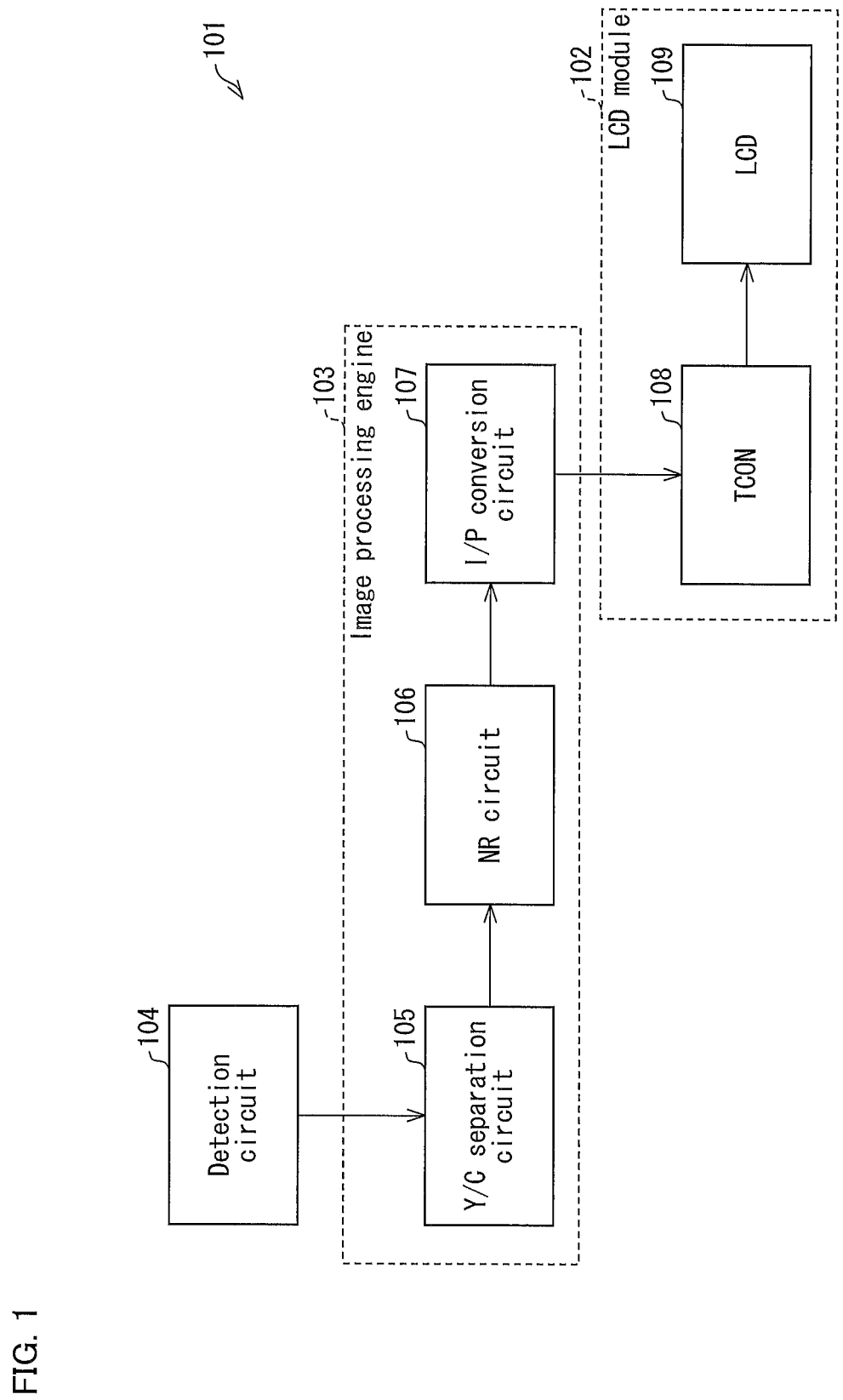
FIG. 1 is a block diagram illustrating schematically a configuration of a liquid crystal display device to which an image processing system of the present invention is applied.

FIG. 1 is a block diagram illustrating the entire configuration of a liquid crystal display device 101, which is a liquid crystal display device to which the first image processing system is applied.

As illustrated in FIG. 1, the liquid crystal display device 101 is configured to include at least: a LCD module 102 for displaying an image; an image processing engine 103 for supplying a video signal of the image to be displayed on the LCD module 102; and a detection circuit 104 for detecting the video signal to be transmitted to the image processing engine 103. Note that the description here is to be made on the assumption that the video signal is a broadcast wave which is an interlace signal, such as an NTSC or a PAL system signal.

In the liquid crystal display device 101, a video signal having broadcasted is detected by the detection circuit 104, and then supplied to an NR (noise reduction) circuit 106 via a Y/C separation circuit 105 in the image processing engine 103. In the NR circuit 106, signal processing processes in accordance with the first image processing system of the present invention are carried out. The video signal supplied to the NR circuit 106 is I/P-converted by an I/P conversion circuit 107 and then supplied to the LCD module 102.

In the LCD module 102, the supplied video signal is displayed on a LCD (liquid crystal panel) 109 via a TCON (timing controller) 108.

Figure 2:
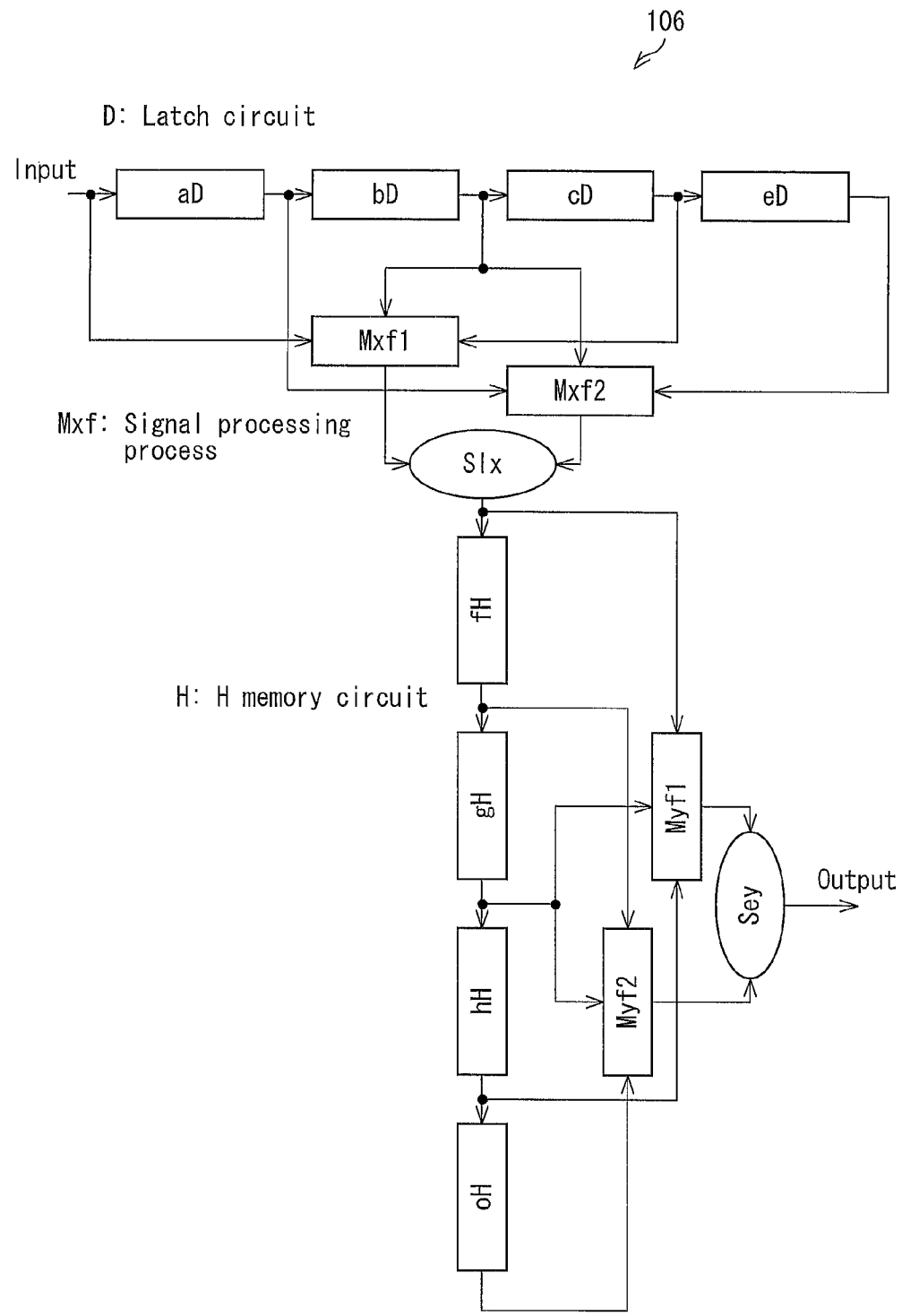
FIG. 2 is a block diagram illustrating schematically a configuration of an NR circuit in an image processing engine provided in the liquid crystal display device of FIG. 1.

FIG. 2 is a block diagram illustrating schematically a configuration of the NR circuit 106.

As illustrated in FIG. 2, the NR circuit 106 is configured to include latch circuits D, signal processing process circuits Mxf, and H memory circuits H.

That is, in the NR circuit 106, the supplied video signal is delayed by latch circuits aD, bD, cD, and eD (where a, b, c, and d are respective coefficients set suitably in accordance with processing) and then supplied to the signal processing process circuits Mxf (signal processing circuit). The signal processing process circuits Mxf include two signal processing process circuits: a first signal processing process circuit Mxf(1), which carries out a first signal processing process; and a second signal processing process circuit Mxf(2), which carries out a second signal processing process, both the first and the second signal processing processes being carried out in the first image processing system of the present invention.

Figure 4:
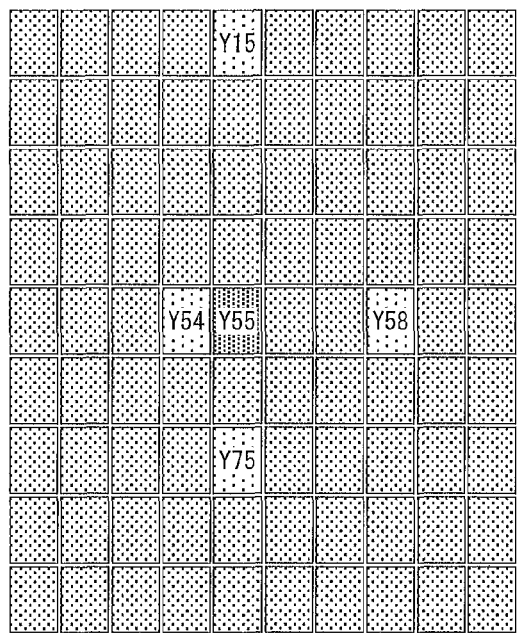
FIG. 4 illustrates processing patterns executed by a signal processing process in the NR circuit of FIG. 2.
Figure 4:
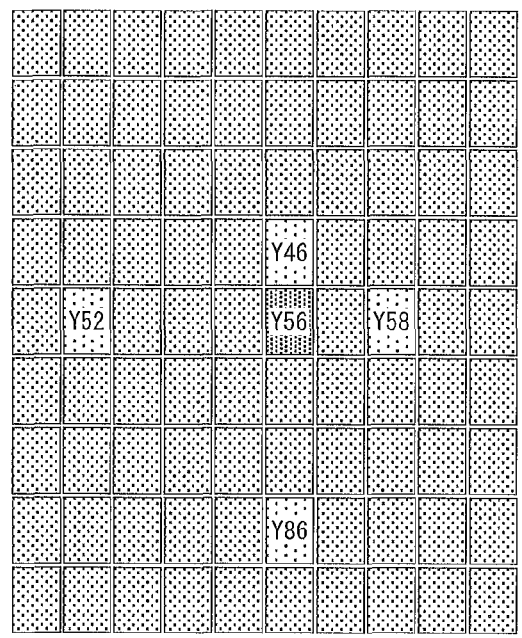
Figure 4:
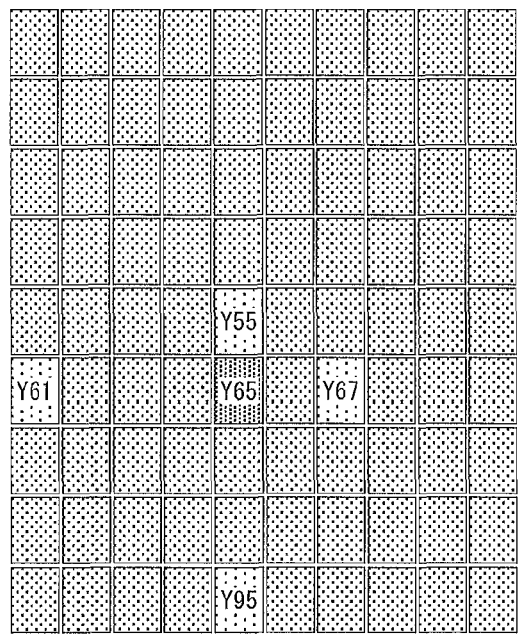
Figure 4:
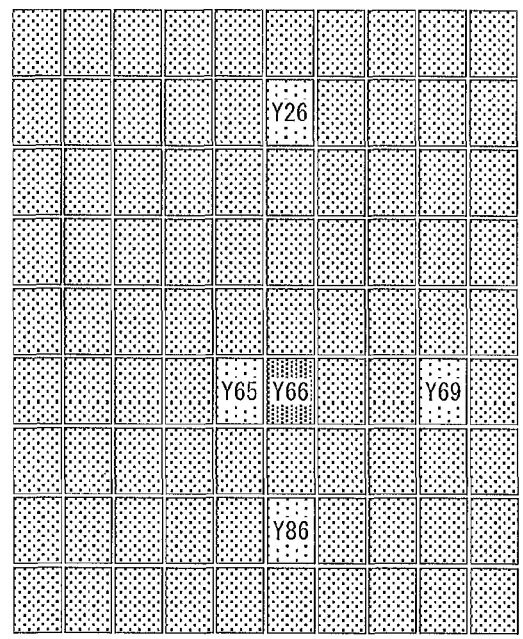

In Embodiment 1, the first and the second signal processing process circuits Mxf(1) and Mxf(2) uses processing patterns illustrated in FIG. 4, in order to carry out the signal processing processes. In a case where the first and the second signal processing processes in a lateral direction are carried out with the use of the processing patterns illustrated in FIG. 4, coefficients of the latch circuits aD, bD, cD, and eD will be a=1, b=2, c=1, and e=3.

Specifically, the first signal processing process circuit Mxf(1) is supplied, with respect to a pixel Aij for even D/odd H or odd D/even H illustrated in FIG. 4, with signals of a pixel Ai(j−4) and a pixel Ai(j+2).

The first signal processing process circuit Mxf(1) then outputs Yij−x when a signal Yij of the pixel Aij is larger than both the signal Yi(j−4) of the pixel Ai(j−4) and the signal Yi(j+2) of the pixel Ai(j+2) (the signal Yij has the largest value among them).

Alternatively, the first signal processing process circuit Mxf(1) then outputs Yij+x when the signal Yij of the pixel Aij is smaller than both the signal Yi(j−4) of the pixel Ai(j−4) and the signal Yi(j+2) of the pixel Ai(j+2)(the signal Yij has the smallest value among them).

The resulting signal of the first signal processing process circuit Mxf(1) is defined as YOij. Note that x is a predetermined noise amount.

On the other hand, the second signal processing process circuit Mxf(2) is supplied, with respect to a pixel Aij for odd D/odd H or even D/even H illustrated in FIG. 4, with signals of a pixel Ai(j−1) and a pixel Ai(j+3).

The second signal processing process circuit Mxf(2) then outputs Yij−x when a signal Yij of the pixel Aij is larger than both the signal Yi(j−1) of the pixel Ai(j−1) and the signal Yi(j+3) of the pixel Ai(j+3) (the signal Yij has the largest value among them).

Alternatively, the second signal processing process circuit Mxf(2) then outputs Yij+x when the signal Yij of the pixel Aij is smaller than both the signal Yi(j−1) of the pixel Ai(j−1) and the signal Yi(j+3) of the pixel Ai(j+3) (the signal Yij has the smallest value among them).

The resulting signal of the second signal processing process circuit Mxf(2) is defined as YEij. Note that x is a predetermined noise amount.

A switch Slx illustrated in FIG. 2 selects (i) YEij with respect to odd pixels in odd lines and even pixels in even lines, and (ii) YOij with respect to even pixels in the odd lines and odd pixels in the even lines. The resulting signal is defined as YXij.

As illustrated above, the present invention carries out the first signal processing process (1) and the second signal processing process (2) in a lateral direction in order to remove noise in a lateral direction. This is effective in noise reduction. However, in order to attain a greater effect of noise reduction, it is possible to carry out noise removal in a vertical direction, which will be described below. That is, in addition to the signal processing processes in a lateral direction, a third signal processing process (3) and a fourth signal processing process (4) in an vertical direction can be carried out.

As illustrated in FIG. 2, the resulting signal YXij is delayed by line memories fH, gH, hH, and oH (where f, g, h, and o are respective coefficients set suitably in accordance with processing) included in the H memory circuits H connected downstream of the switch Slx, and then supplied to signal processing process circuits Myf. The signal processing process circuits Myf include two signal processing process circuits: a third signal processing process circuit Myf(3), which carries out a third signal processing process, and a fourth signal processing process circuit Myf(4), which carries out a fourth signal processing process, both the third and the fourth signal processing processes are carried out in the first image processing system of the present invention.

In Embodiment 1, the third and the fourth signal processing process circuits Myf(1) and Myf(2) uses processing patterns illustrated in FIG. 4, in order to carry out the signal processing processes. In a case where the third and the fourth signal processing processes (3) and (4) are carried out in a vertical direction with the use of the processing patterns illustrated in FIG. 4, coefficients of the line memories fH, gH, hH, and oH will be f=1, g=2, h=1, and o=3.

Specifically, the third signal processing process circuit Myf(1) is supplied, with respect to a pixel Aij for odd D/even H or even D/odd H illustrated in FIG. 4, with signals of a pixel A(i−4)j and a pixel A(i+2)j.

The third signal processing process circuit Myf(1) then outputs YXij−y when a signal YXij of the pixel Aij is larger than both the signal YX(i−4)j of the pixel A(i−4)j and the signal YX(i+2)j of the pixel A(i+2)j (the signal YXij has the largest value among them).

Alternatively, the third signal processing process circuit Myf(1) then outputs YXij+y when the signal YXij of the pixel Aij is smaller than both the signal YX(i−4)j of the pixel A(i−4)j and the signal YX(i+2)j of the pixel A(i+2)j (the signal YXij has the smallest value among them).

The resulting signal of the third signal processing process circuit Myf(1) is defined as YTij. Note that y is a predetermined noise amount.

On the other hand, the fourth signal processing process circuit Myf(2) is supplied, with respect to a pixel Aij for odd D/odd H or even D/even H illustrated in FIG. 4, with signals of a pixel A(i−1)j and a pixel A(i+3)j.

The fourth signal processing process circuit Myf(2) then outputs YXij−y when a signal YXij of the pixel Aij is larger than both the signal YX(i−1)j of the pixel A(i−1)j and the signal YX(i+3)j of the pixel A(i+3)j (the signal YXij has the largest value among them).

Alternatively, the fourth signal processing process circuit Myf(2) then outputs YXij+y when the signal YXij of the pixel Aij is smaller than both the signal YX(i−1)j of the pixel A(i−1)j and the signal YX(i+3)j of the pixel A(i+3)j (the signal YXij has the smallest value among them).

The resulting signal of the fourth signal processing process circuit Myf(2) is defined as YUij. Note that y is a predetermined noise amount.

A switch Sly illustrated in FIG. 2 selects (i) YTij with respect to even pixels in odd lines and odd pixels in even lines, and (ii) YUij with respect to odd pixels in the odd lines and even pixels in the even lines. The resulting signal is defined as YYij.

Figure 3:
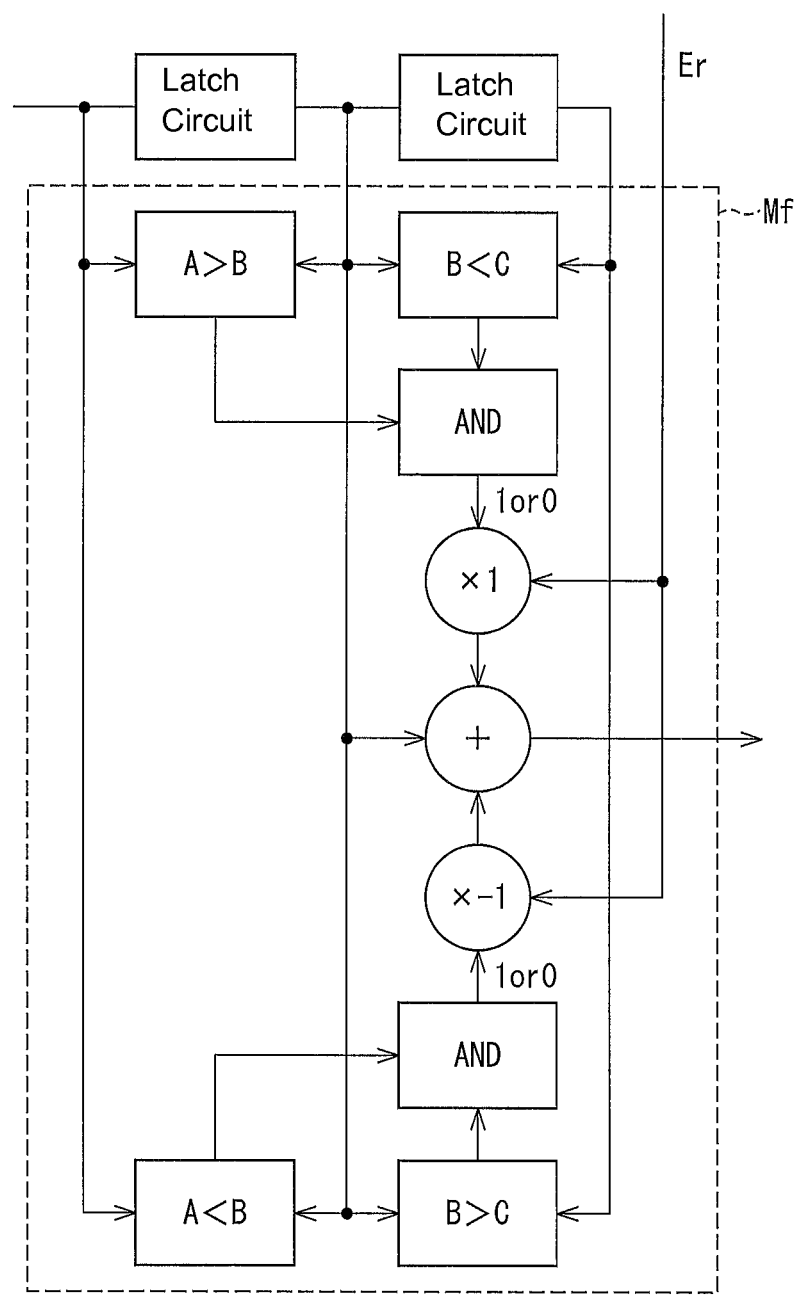
FIG. 3 is a block diagram illustrating schematically a configuration of the NR circuit of FIG. 2.

The first through fourth signal processing process circuits Myf(1) through Myf(4) can be implemented by, for example, a circuit illustrated in FIG. 3.

Figure 5:
FIG. 5 shows an example of an image having subjected to a noise reduction process with the use of the processing patterns illustrated in FIG. 4.
Figure 23:
FIG. 23 shows an original image to be subjected to a noise reduction process.

FIG. 5 shows a resulting image obtained by applying a noise reduction process with the use of a signal processing algorithm (processing patterns illustrated in FIG. 4) to an original image shown in FIG. 23, noise reduction process being carried out by the above described NR circuit 106. Note that MATLAB is used to verify the algorithm.

Figure 24:
FIG. 24 shows an image obtained by applying a noise reduction process with the use of the adaptive low-pass filter of FIG. 20 to the original image of FIG. 23.

As is clear from a comparison between the image shown in FIG. 5 and an image example conventionally obtained shown in FIG. 24, the image shown in FIG. 5, that is, the image obtained by the signal processing processes of Embodiment 1, is less noisy.

Meanwhile, the following description will discuss an effect brought about in a case where respective adjacent pixels are subjected to signal processing processes in which respective different noise processing parameters are used, as with the first image processing system of the present invention.

Figure 6:
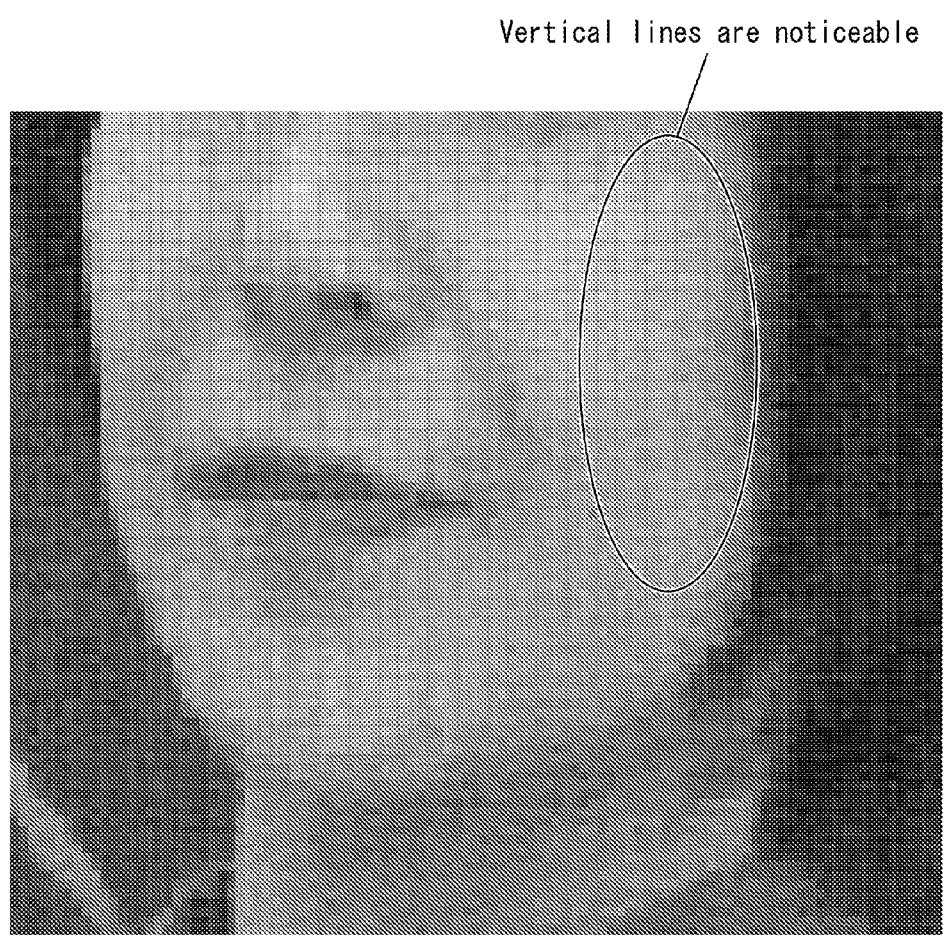
FIG. 6 shows an enlarged image having subjected to a conventional noise reduction process.

FIG. 6 shows a resulting image obtained by applying to all pixels (i) the second signal processing process in the second signal processing process circuit Mxf(2) of FIG. 2, and then (ii) the third signal processing process circuit Myf(1).

That is, the second signal processing process circuit Mxf(2) is supplied, with respect to the pixel Aij, with signals of the pixel Ai(j−1) and the pixel Ai(j+3).

The second signal processing process circuit Mxf(2) then outputs Yij−x when the signal Yij of the pixel Aij is larger than both the signal Yi(j−1) of the pixel Ai(j−1) and the signal Yi(j+3) of the pixel Ai(j+3) (the signal Yij has the largest value among them).

Alternatively, the second signal processing process circuit Mxf(2) then outputs Yij+x when the signal Yij of the pixel Aij is smaller than both the signal Yi(j−1) of the pixel Ai(j−1) and the signal Yi(j+3) of the pixel Ai(j+3) (the signal Yij has the smallest value among them).

The resulting signal of the second signal processing process circuit Mxf(2) is defined as YEij.

Subsequently, the third signal processing process circuit Myf(1) is supplied, with respect to the pixel Aij, with signals of the pixel A(i−4)j and the pixel A(i+2)j.

The third signal processing process circuit Myf(1) then outputs YEij−y when the signal YEij of the pixel Aij is larger than both the signal YE(i−4)j of the pixel A(i−4)j and the signal YE(i+2)j of the pixel A(i+2)j (the signal YEij has the largest value among them).

Alternatively, the third signal processing process circuit Myf(1) then outputs YEij+y when the signal YEij of the pixel Aij is smaller than both the signal YE(i−4)j of the pixel A(i−4)j and the signal YE(i+2)j of the pixel A(i+2)j (the signal YEij has the smallest value among them).

Figure 7:
FIG. 7 is an enlarged view of the image of FIG. 5.

When the resulting image shown in FIG. 6 is compared with an image shown in FIG. 7, which is an enlarged view of the image of FIG. 5, the image of FIG. 6 has noticeable vertical lines. In contrast, the image of FIG. 7 has particulate noises. As is clear from the comparison, the image of FIG. 7 does not have noticeable vertical lines.

For determination whether the noise amount x or y is added to or subtracted from the signal Yij of the pixel Aij, it can be configured such that the noise amount x or y is added to or subtracted from only when the signal Yij of the pixel Aij is larger (smaller) than both signals of two comparative pixels by x/A and y/A or more (or less) (where A is a real number of 1 or more). This is effective to prevent (i) a video picture from blurring and (ii) intrinsic very fine gradation in the video picture from being damaged.

In Embodiment 1, the noise amounts x and y can be obtained from the dimension of noise which occurs during a blanking period.

However, recording media, such as a DVD (Digital Versatile Disc), do not record blanking periods. Therefore, once analog broadcasting is recorded in a DVD or other mediums, it is impossible to estimate a noise amount from blanking periods.

Therefore, in Embodiment 1, fixed noise amounts, i.e., noise amounts which are expressed by an equation of x=y=10/255 are used.

The following description will discuss Embodiment 2, as an exemplified image processing system having means for detecting noise amounts from a video picture.

<Embodiment 2>

Embodiment 2 will discuss the second image processing system of the present invention.

In Embodiment 2, a liquid crystal display device 101, as a display device to which the second image processing system of the present invention is applied, is equivalent to the liquid crystal display device 101 of Embodiment 1 and its entire description will be omitted.

The following description of Embodiment 2 will mainly address differences between Embodiment 2 and Embodiment 1.

Figure 8:
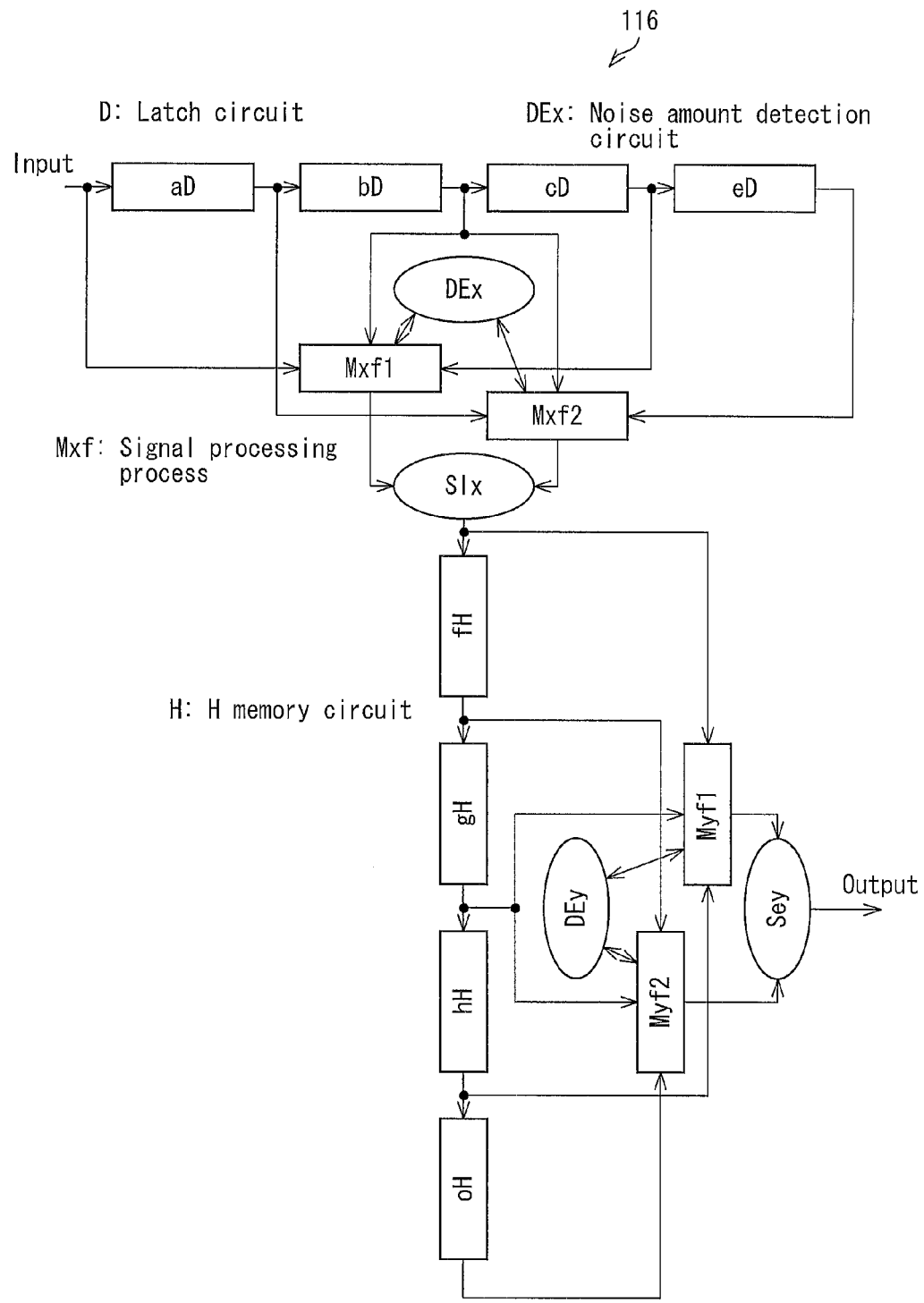
FIG. 8 is a block diagram illustrating schematically another configuration of an NR circuit in an image processing engine provided in the liquid crystal display device of FIG. 1.

FIG. 8 is a block diagram illustrating schematically a configuration of an NR circuit 116 in accordance with Embodiment 2.

As with Embodiment 1, the NR circuit 116 is configured to include latch circuits D, signal processing process circuits Mxf, and H memory circuits H. As illustrated in FIG. 8, the NR circuit 116 further includes noise amount detection circuits DE (noise amount detection circuits DEx and DEy). The noise amount detection circuit DEx is a circuit which is not included in the NR circuit 106 in Embodiment 1.

The following description will discuss a signal processing process in the NR circuit 116.

In Embodiment 2, the first signal processing process circuit Mxf(1) and the second signal processing process circuit Mxf(2) detect a noise amount xij.

The following description will discuss how to detect the noise amount xij on the assumption that the latch circuits D include latch circuits Da through De, where a=1, b=2, c=1, and e=3.

First, the first signal processing process circuit Mxf(1) is supplied with signals of pixels Aij, Ai(j−4), and Ai(j+2).

When the signal Yij of the pixel Aij is larger than both the signal Yi(j−4) of the pixel Ai(j−4) and the signal Yi(j+2) of the pixel Ai(j+2) (the signal Yij has the largest value among them), then the noise amount xij is expressed in the following Formula:

$$xij=Yij-(Yi(j-4)+Yi(j+2))/2$$

Alternatively, when the signal Yij of the pixel Aij is smaller than both the signal Yi(j−4) of the pixel Ai(j−4) and the signal Yi(j+2) of the pixel Ai(j+2) (the signal Yij has the smallest value among them), then the noise amount xij is expressed in the following Formula:

$$xij=(Yi(j-4)+Yi(j+2))/2-Yij$$

The value xij and n=1 are supplied to the noise amount detection circuit DEx. Otherwise, n=0 is supplied to the noise amount detection circuit DEx.

On the other hand, the second signal processing process circuit Mxf(2) is supplied with signals of pixels Aij, Ai(j−1) and Ai(j+3).

When the signal Yij of the pixel Aij is larger than both the signal Yi(j−1) of the pixel Ai(j−1) and the signal Yi(j+3) of the pixel Ai(j+3) (the signal Yij has the largest value among them), then the noise amount xij is expressed in the following Formula:

$$xij=Yij-(Yi(j-1)+Yi(j+3))/2$$

Alternatively, when the signal Yij of the pixel Aij is smaller than both the signal Yi(j−1) of the pixel Ai(j−1) and the signal Yi(j+3) of the pixel Ai(j+3) (the signal Yij has the smallest value among them), then the noise amount xij is expressed in the following Formula:

$$xij=(Yi(j-1)+Yi(j+3))/2-Yij$$

The value xij and n=1 are supplied to the noise amount detection circuit DEx. Otherwise, n=0 is supplied to the noise amount detection circuit DEx.

On the noise amount detection circuit DEx, a noise amount x in a subsequent field (or frame) is determined on the basis of (i) the number of pixels where n=1 and (ii) sum of the noise amounts xij. The noise amount x thus determined is supplied to the first and the second signal processing process circuits Mxf(1) and Mxf(2).

Similarly, the third signal processing process circuit Myf(1) and the fourth signal processing process circuit Myf(2) detect a noise amount yij.

The following description will discuss how to detect the noise amount yij on the assumption that the H memory circuits H include line memories fH, gH, hH, and oH, where f=1, g=2, h=1, and o=3.

First, the third signal processing process circuit Myf(1) is supplied with signals of pixels Aij, A(i−4)j, and A(i+2)j.

When the signal YXij of the pixel Aij is larger than both the signal YX(i−4)j of the pixel A(i−4)j and the signal YX(i+2)j of the pixel A(i+2)j (the signal YXij has the largest value among them), then the noise amount yij is expressed in the following Formula:

$$yij=YXij-(YX(i-4)j+YX(i+2)j)/2$$

Alternatively, when the signal YXij of the pixel Aij is smaller than both the signal YX(i−4)j of the pixel A(i−4)j and the signal Y(i+2)j of the pixel A(i+2)j (the signal YXij has the smallest value among them), then the noise amount yij is expressed in the following Formula:

$$yij=(YX(i-4)j+YX(i+2)j)/2-YXij$$

The value yij and n=1 are supplied to the noise amount detection circuit DEy. Otherwise, n=0 is supplied to the noise amount detection circuit DEy.

On the other hand, the fourth signal processing process circuit Myf(2) is supplied with signals of pixels Aij, A(i−1)j, and A(i+3)j.

When the signal Yij of the pixel Aij is larger than both the signal Y(i−1)j of the pixel A(i−1)j and the signal Y(i+3)j of the pixel A(i+3)j (the signal Yij has the largest value among them), then the noise amount yij is expressed in the following Formula:

$$yij=YXij-(YX(i-1)j+YX(i+3)j)/2$$

Alternatively, when the signal Yij of the pixel Aij is smaller than both the signal YX(i−1)j of the pixel A(i−1)j and the signal YX(i+3)j of the pixel A(i+3)j (the signal YXij has the smallest value among them), then the noise amount yij is expressed in the following Formula:

$$yij=(YX(i-1)j+YX(i+3)j)/2-Yxij$$

The value yij and n=1 are supplied to the noise amount detection circuit DEy. Otherwise, n=0 is supplied to the noise amount detection circuit DEy.

In the noise amount detection circuit DEy, a noise amount y in a subsequent field (or frame) is determined on the basis of (i) the number of pixels where n=1 and (ii) sum of the noise amounts yij. The noise amount y thus determined is supplied to the third and the fourth signal processing process circuits Myf(1) and Mxf(2).

Figure 9:
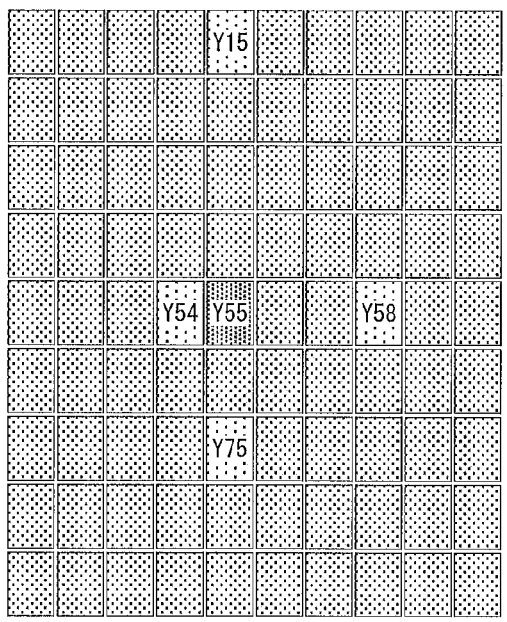
FIG. 9 is illustrates processing patterns executed by a signal processing process in the NR circuit of FIG. 8.
Figure 9:
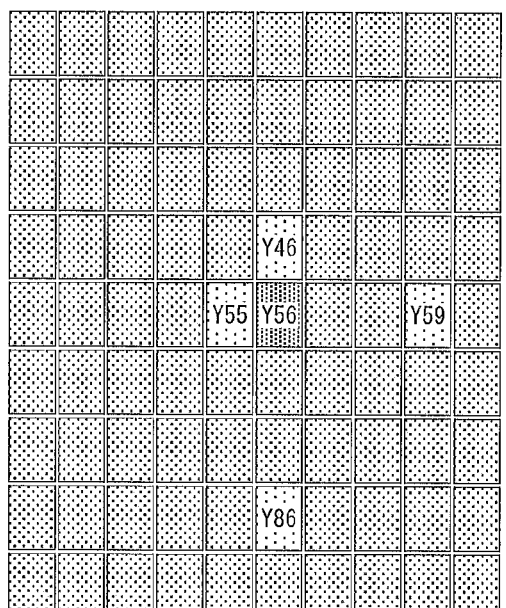
Figure 9:
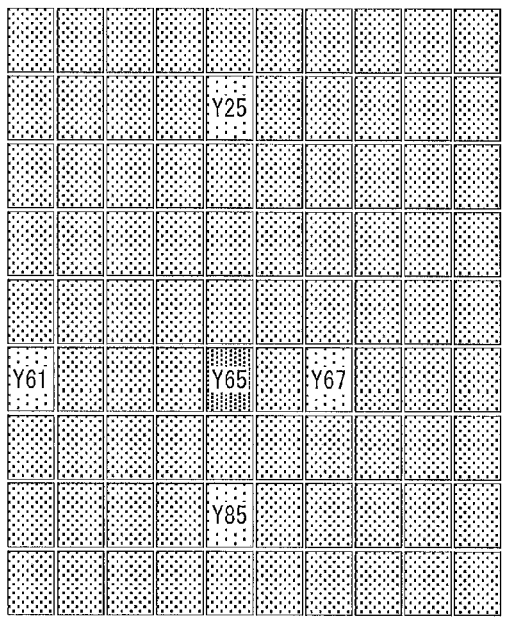
Figure 9:
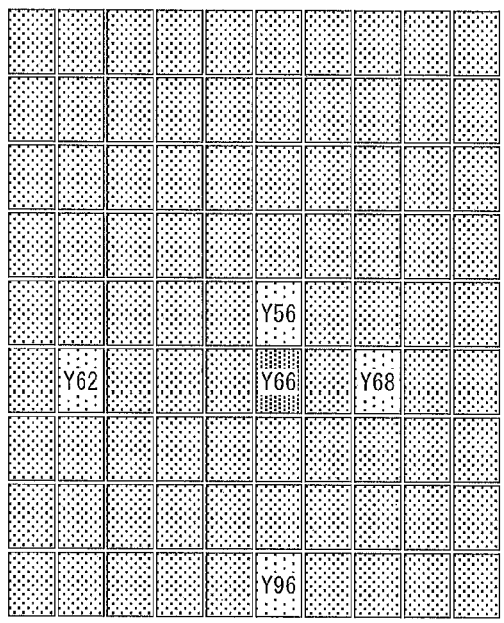
Figure 10:
FIG. 10 shows an example of an image having subjected to a noise reduction process with the use of the processing patterns illustrated in FIG. 9.

FIG. 10 shows a resulting image obtained by carrying out, with respect to the original image shown in FIG. 23, the signal processing processes with the use of the lattice-shaped processing patterns illustrated in FIG. 9, the signal processing processes being carried out by the noise detection circuits DEx and DEy.

Figure 11:
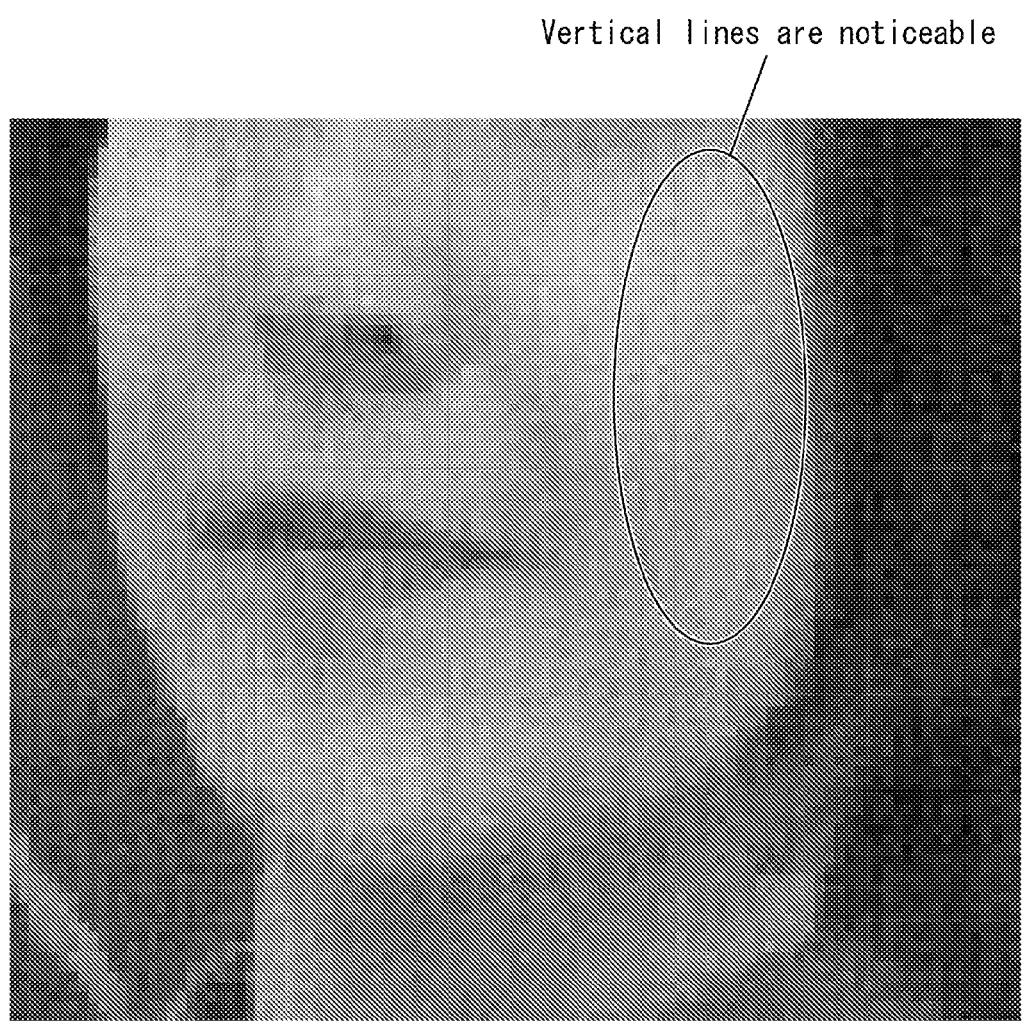
FIG. 11 is an enlarged view of the image of FIG. 10.

As is clear from a comparison of the image of FIG. 10 with the resulting image of Embodiment 1 shown in FIG. 5, it is possible to obtain an image which is less noisy by determining noise amounts with the use of the above-described process (hereinafter referred to as a noise amount determination process) than by using fixed noise amounts. As is further clear from a comparison of the image shown in FIG. 11, which is an enlarged view of the image of FIG. 10, with the image shown in FIG. 7, which is an enlarged view of the image of FIG. 5, noise is better reduced in Embodiment 2 than Embodiment 1.

Specifically, in FIG. 10, different noise amounts are set for respective signals: a luminance signal Y, a color signal Cr, and a color signal Cb. The determined noise amounts x and y will be shown below.

Actually, the noise amounts are determined by the noise amount determination process carried out with respect to the original image of FIG. 23. The results are shown as below:

$$xY\approx0.061, xCr\approx0.008, xCb\approx0.008$$

$$yY\approx0.068, yCr\approx0.009, xCb\approx0.008$$

Note that the signal processing carried out with respect to an image of FIG. 10 uses noise amounts which are 0.6 times as much as the detected noise amounts. Since, as the results shows, each of the color-difference signals has a noise level which is smaller than that of the luminance signal Y, only the luminance signal Y can be subjected to a noise reduction process. This allows downsizing of the circuits.

Also note that the results detected in the first signal processing process circuit Mxf(1) can be used in all other signal processing processes in order to detect only noise amounts.

And, when the signal Yij of the pixel Aij is larger than both a signal Yi(j−1) of the pixel Ai(j−1) and a signal Yi(j+1) of the pixel Ai(j+1) (the signal Yij has the largest value among them), then the noise amount xij is expressed in the following Formula:

$$xij=Yij-(Yi(j-1)+Yi(j+1))/2$$

Alternatively, when the signal Yij of the pixel Aij is smaller than both the signal Yi(j−1) of the pixel Ai(j−1) and the signal Yi(j+1) of the pixel Ai(j+1) (the signal Yij has the smallest value among them), then the noise amount xij is expressed in the following Formula:

$$xij=(Yi(j-1)+Yi(j+1))/2-Yij$$

The value xij and n=1 can be supplied to the noise amount detection circuit DEx. Otherwise, n=0 can be supplied the noise amount detection circuit DEx.

In this case, noise amounts are determined as shown below.

$$xY\approx0.055, xCr\approx0.006, xCb\approx0.006$$

Figure 12:
FIG. 12 shows an example of an image having subjected to a noise reduction process with the use of the processing patterns illustrated in FIG. 9.

FIG. 12 shows a resulting image obtained by carrying out a signal processing process in which the determined noise amounts are used also in a y direction.

As is clear from FIG. 12, the image of FIG. 12 is substantially equivalent to the image of FIG. 10.

Note that the noise amount determination process in accordance with the present invention is effective also in a case where any one of the processing patterns of FIG. 9 is used for all pixels.

Figure 13:
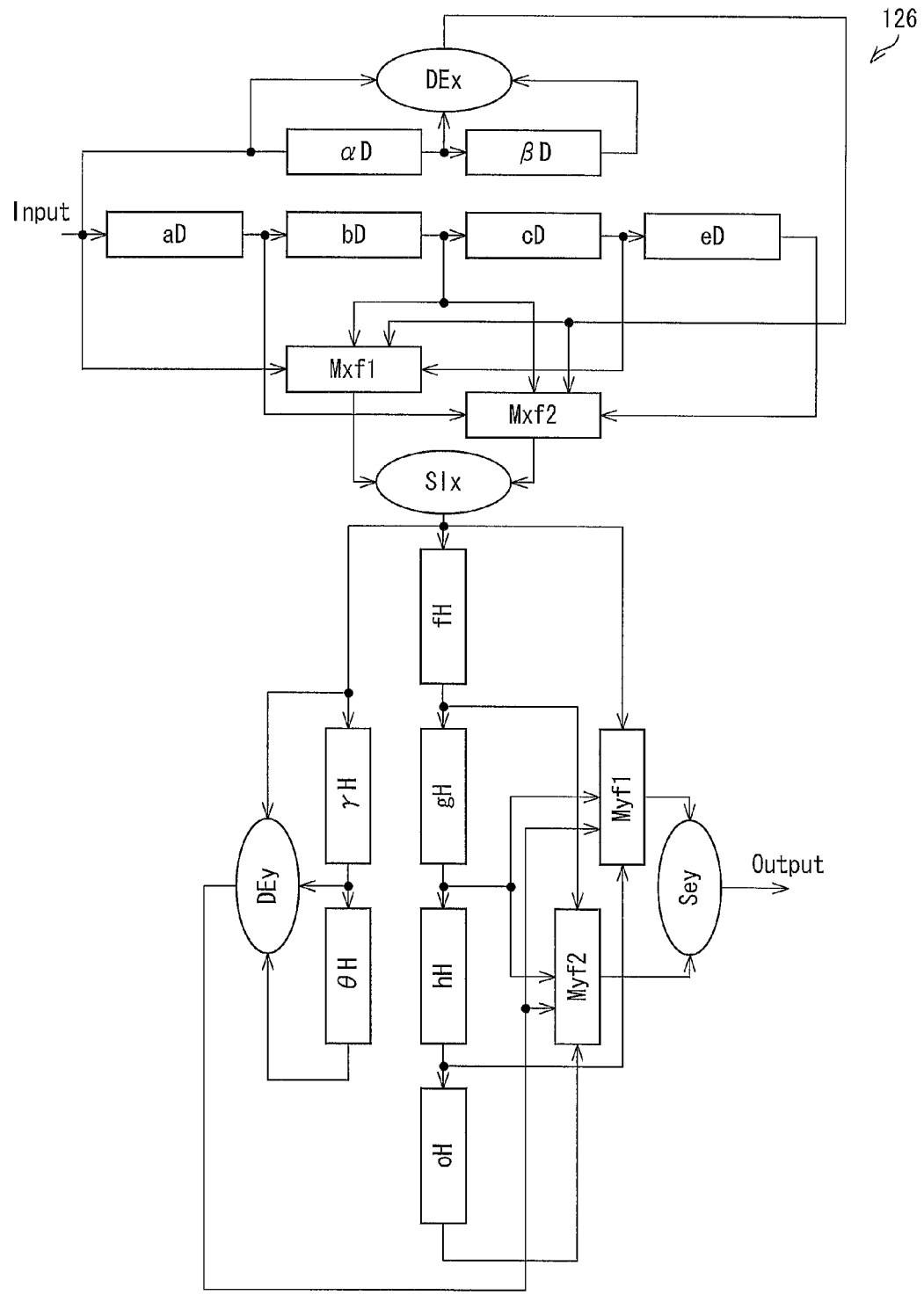
FIG. 13 is a block diagram illustrating schematically yet another configuration of an NR circuit in an image processing engine provided in the liquid crystal display device of FIG. 1.

In the noise amount detection carried out in the NR circuit 116 illustrated in FIG. 8, each noise amount detection circuit detects noise amounts with the number of taps same as that of signal processing process. Note, however, that the way to detect noise amounts is not limited to this. Examples of the way to detect noise amounts include therefore a way as illustrated in FIG. 13, in which noise amounts are detected with two taps, whereas a signal processing process is carried out with four taps. That is, the number of taps of the noise amount detection is not necessarily equal to the number of taps of the signal processing process.

Embodiments 1 and 2 have discussed the noise reduction processes which are carried out within a field (or a frame). Note, however, that a noise reduction process can of course be effectively carried out not only in a lateral or vertical direction but also in a temporal direction.

That is, it is possible to carry out, prior to the noise reduction process of Embodiment 1 or 2, the signal processing process in a field direction (or a frame direction). This confers a benefit of obtaining a video picture which is less noisy. However, it requires a larger memory capacity, resulting in high cost.

Note that, in Embodiments 1 and 2, respective adjacent pixels can be subjected to signal processing processes in vertical and lateral directions in different orders.

Further, Embodiments 1 and 2 have described examples in which respective adjacent pixels are subjected to different signal processing processes in both vertical and lateral directions. Note, however, that the signal processing processes are not limited to those. Examples of a noise reduction process therefore include one in which respective adjacent pixels are subjected to different signal processing processes in any one of a vertical direction and a lateral direction.

It is possible that, after carrying out the first and the second signal processing processes, the signal processing process circuit Mxf (the signal processing circuit) carries out again respective of the first and the second signal processing processes under different temporal or positional conditions.

According to the configuration, after carrying out the first and the second signal processing processes, the signal processing circuit carries out again respective of the first and the second signal processing processes under different temporal or positional conditions. This allows removing noise which has not been removed in the first and the second signal processing processes which are previously carried out.

This results in more reliable noise reduction. It is thus possible to make noise less noticeable in a video picture having been subjected to the noise reduction process.

It is possible that, after carrying out the first and the second signal processing processes, the signal processing process circuit Mxf (signal processing circuit) carries out again respective of the first and the second signal processing processes with the use of another noise amount x to be added or subtracted.

According to the configuration, after carrying out the first and the second signal processing processes, the signal processing circuit carries out carries out again respective of the first and the second signal processing processes with the use of another noise amount x to be added or subtracted. This allows removing noise which has not been removed in the first and the second signal processing processes which are previously carried out.

This results in more reliable noise reduction. It is thus possible to make noise less noticeable in a video picture having been subjected to the noise reduction process.

It is possible that, before or after carrying out the first and the second signal processing processes, the signal processing process circuit Mxf (signal processing circuit) carries out a third signal processing process, in which the signal processing circuit (a) subtracts a predetermined noise amount y from data of a target pixel g when the target pixel g has a signal level which is larger than both signal levels of pixels h and o or (b) adds the predetermined noise amount y to the data of the target pixel g when the target pixel g has a signal level which is smaller than both signal levels of the pixels h and o, where the pixel h is located at a distance of r pixel from the target pixel g temporally or positionally, and the pixel o is located at a distance of −u (where u is an integer) pixel from the target pixel g temporally or positionally (where h and o are respective positive integers).

According to the configuration, before or after carrying out the first and the second signal processing processes, which are (i) different processes constituting a noise reduction process and (ii) carried out for respective pixels adjacent to each other temporally or positionally, the third signal processing process is carried out in which all pixels are subjected to a noise reduction process in a same signal processing process.

In a case where the third signal processing process is carried out before the first and the second signal processing processes, noise in each pixel will be reduced to some extent at the time of carrying out the first and the second signal processing processes. The first and the second signal processing processes which will be carried out later can thus reduce noise more reliably.

Alternatively, in a case where the third signal processing process is carried out after the first and the second signal processing processes, the third signal processing process can reduce noise in each pixel which has not been removed in the first and the second signal processing processes. This allows more reliable noise reduction.

It is possible for the signal processing process circuit Mxf (the signal processing circuit) to carry out (i) a first signal processing process and (ii) a noise amount determination process, in (i) the first signal processing process, the signal processing circuit (a) subtracting a predetermined noise amount x from data of a target pixel a when the target pixel a has a signal level which is larger than both signal levels of pixels b and c or (b) adding the predetermined noise amount x to the data of the target pixel a when the target pixel a has a signal level which is smaller than both signal levels of the pixels b and c, where the pixel b is located at a distance of n (where n is an integer) pixel from the target pixel a temporally or positionally, and the pixel c is located at a distance of −m (where m is an integer) pixel from the target pixel a temporally or positionally, and in (ii) the noise amount determination process, the image processing system determines the noise amount x on the basis of an average value obtained by averaging, over a certain time period, differences between respective signal levels of the target pixel a and respective average values of signal levels of the pixel b and c when the signal level of the target pixel a is larger or smaller than both the signal levels of the pixel b and c.

According to the configuration, the signal processing process circuit Mxf (the signal processing circuit) is configured to determine the noise amount x, which is to be used in the first signal processing process to which the target pixel a is subjected, on the basis of an average value obtained by averaging, over a certain time period, differences between respective signal levels of the target pixel a and respective average values of signal levels of the pixel b and c when the signal level of the target pixel a is larger or smaller than both the signal levels of the pixel b and c. This allows the target pixel a to be subjected to a noise reduction more appropriately. It is thus possible to make noise less noticeable.

It is possible that the signal processing process circuit Mxf (signal processing circuit) carries out (ii) the noise amount determination process in a first frame or field, and (i) the first signal processing process in a second frame or field by which the first frame or field is followed.

In a case where the noise amount determination process is carried out in the first frame or field so as to determine a noise amount, it is possible to reduce noise reliably even if the noise amount determined in the first frame is used in the second frame. This is because a noise amount is constant over a plurality of frames.

This allows eliminating the need of carrying out the noise amount determination process with respect to each frame or field. It is thus possible to simplify the noise reduction process.

It is possible that the signal processing process circuit Mxf (signal processing circuit) carries out a second signal processing process, in which the signal processing circuit (a) subtracts the predetermined noise amount x from data of a target pixel d when the target pixel d has a signal level which is larger than both signal levels of pixels e and f or (b) adds the predetermined noise amount x to the data of the target pixel d when the target pixel d has a signal level which is smaller than both signal levels of the pixels e and f, where the pixel e is located at a distance of p (where p is an integer) pixel from the target pixel d temporally or positionally, and the pixel f is located at a distance of −q (where q is an integer) pixel from the target pixel d temporally or positionally, and the target pixel d is adjacent to the target pixel a temporally or positionally.

According to the configuration, the pixels a and d which are adjacent to each other temporally or positionally are subjected to respective different signal processing processes for reducing noise. Therefore, even in a case where noise occurs in both the pixels a and d, and the noise can become continuous noise, probability in which noise remains in both the pixels will significantly be reduced. This prevents the continuous noise from becoming a large noise agglomerate. As the result, it is possible to make noise in a video picture having been subjected to the noise reduction process less noticeable.

Besides, the noise amount x to be used in each signal processing process has been obtained from the signal levels of the surrounding pixels. It is thus possible to reduce noise appropriately.

The above described image processing system can be applied to a display device for displaying a video picture by means of pixels arranged in matrix, such as a liquid crystal display device.

Let it be assumed that the image processing system of the present invention is applied to a display device, which displays a noisy video signal ((i) an analog broadcast video signal which is weak in electric field or (ii) a digital broadcast video signal obtained by digitalizing an analog video picture recorded on video tape). In this case, the image processing system of the present invention can attain both noise reduction of the video signal and blur reduction of the video picture. The display device can thus display a video picture having an excellent display quality.

The present invention is not limited to the Embodiments, and various modifications are therefore possible within a scope defined by Claims. The technical scope of the present invention encompasses embodiments obtained by appropriately combining the technical means disclosed in the different embodiments.

INDUSTRIAL APPLICABILITY

The present invention is applicable to a device for processing an image signal or an audio signal. In particular, the present invention is appropriately applicable to a display device for displaying a static image or a moving image, an electronic apparatus including the display device, and other devices.

REFERENCE SIGN LIST

101 Liquid crystal display device
102 LCD module
103 Image processing engine
104 Detection circuit
105 Y/C separation circuit
106 NR circuit
107 I/P conversion circuit
108 TCON
109 LCD
116 NR circuit
D Latch circuit
DE Noise amount detection circuit
H memory circuit
Mxf Signal processing process circuit

The invention claimed is:

1. An image processing system for processing pixels arranged in matrix, the pixels corresponding to image data transmitted to the image processing system, said image processing system comprising:
a signal processing circuit arranged to carry out signal processing processes in each of which the signal processing circuit adds or subtracts a predetermined noise amount to or from data of a target pixel in accordance with a result of a comparison of signal levels between the target pixel and at least two surrounding pixels which are beside the target pixel, wherein
respective pixels temporally or positionally adjacent to each other undergo different signal processing processes such that the signal processing circuit carries out the different signal processing processes to add or subtract the predetermined noise amount to or from data of the respective pixels temporally or positionally adjacent to each other.

2. A display device comprising a display section for displaying image data processed by an image processing system as set forth in claim 1.

3. An image processing system for processing pixels arranged in matrix, the pixels corresponding to image data transmitted to the image processing system, said image processing system comprising:
a signal processing circuit for carrying out (i) a first signal processing process and (ii) a second signal processing process,
in (i) the first signal processing process, the signal processing circuit (a) subtracting a predetermined noise amount x from data of a target pixel a when the target pixel a has a signal level which is larger than both signal levels of pixels b and c or (b) adding the predetermined noise amount x to the data of the target pixel a when the target pixel a has a signal level which is smaller than both signal levels of the pixels b and c, where the pixel b is located at a distance of n (where n is an integer) pixel from the target pixel a temporally or positionally, and the pixel c is located at a distance of −m (where m is an integer) pixel from the target pixel a temporally or positionally, and
in (ii) the second signal processing process, the signal processing circuit (a) subtracting the predetermined noise amount x from data of a target pixel d when the target pixel d has a signal level which is larger than both signal levels of pixels e and f or (b) adding the predetermined noise amount x to the data of the target pixel d when the target pixel d has a signal level which is smaller than both signal levels of the pixels e and f, where the pixel e is located at a distance of p (where p is an integer) pixel from the target pixel d temporally or positionally, and the pixel f is located at a distance of −q (where q is an integer) pixel from the target pixel d temporally or positionally, the target pixel a and the target pixel d being adjacent to each other temporally or positionally, and the respective integers n, m, p, and q satisfying relations of n≠p and m≠q.

4. The image processing system as set forth in claim 3, wherein:

after carrying out the first and the second signal processing processes, the signal processing circuit carries out again respective of the first and the second signal processing processes under different temporal or positional conditions.

5. The image processing system as set forth in claim 3, wherein:

after carrying out the first and the second signal processing processes, the signal processing circuit carries out again respective of the first and the second signal processing processes with the use of another noise amount x.

6. The image processing system as set forth in claim 3, wherein:

before or after carrying out the first and the second signal processing processes, the signal processing circuit carries out a third signal processing process, in which the signal processing circuit (a) subtracts a predetermined noise amount y from data of a target pixel g when the target pixel g has a signal level which is larger than both signal levels of pixels h and o or (b) adds the predetermined noise amount y to the data of the target pixel g when the target pixel g has a signal level which is smaller than both signal levels of the pixels h and o, where the pixel h is located at a distance of r pixel from the target pixel g temporally or positionally, and the pixel o is located at a distance of −u (where u is an integer) pixel from the target pixel g temporally or positionally (where h and o are respective positive integers).

7. An image processing system for processing pixels arranged in matrix, the pixels corresponding to image data transmitted to the image processing system, wherein:

the image processing system carries out (i) a first signal processing process and (ii) a noise amount determination process, in (i) the first signal processing process, the image processing system (a) subtracts a predetermined noise amount x from data of a target pixel a when the target pixel a has a signal level which is larger than both signal levels of pixels b and c or (b) adds the predetermined noise amount x to the data of the target pixel a when the target pixel a has a signal level which is smaller than both signal levels of the pixels b and c, where the pixel b is located at a distance of n (where n is an integer) pixel from the target pixel a temporally or positionally, and the pixel c is located at a distance of −m (where m is an integer) pixel from the target pixel a temporally or positionally, and in (ii) the noise amount determination process, the image processing system determines the noise amount x on the basis of an average value obtained by averaging, over a certain time period, differences between respective signal levels of the target pixel a and respective average values of signal levels of the pixel b and c when the signal level of the target pixel a is larger or smaller than both the signal levels of the pixel b and c.

8. The image processing system as set forth in claim 7 further comprising a signal processing circuit, wherein:

the signal processing circuit carries out (ii) the noise amount determination process in a first frame or field, and (i) the first signal processing process in a second frame or field by which the first frame or field is followed.

9. The image processing system as set forth in claim 7 further comprising a signal processing circuit, wherein:

the signal processing circuit carries out a second signal processing process, in which the signal processing circuit (a) subtracts the predetermined noise amount x from data of a target pixel d when the target pixel d has a signal level which is larger than both signal levels of pixels e and f or (b) adds the predetermined noise amount x to the data of the target pixel d when the target pixel d has a signal level which is smaller than both signal levels of the pixels e and f, where the pixel e is located at a distance of p (where p is an integer) pixel from the target pixel d temporally or positionally, and the pixel f is located at a distance of −q (where q is an integer) pixel from the target pixel d temporally or positionally, and the target pixel d is adjacent to the target pixel a temporally or positionally.

* * * * *